United States Patent [19]

Park

[11] 4,313,080
[45] Jan. 26, 1982

[54] METHOD OF CHARGE CONTROL FOR VEHICLE HYBRID DRIVE BATTERIES

[75] Inventor: Robert H. Park, Brewster, Mass.

[73] Assignee: Battery Development Corporation, New York, N.Y.

[21] Appl. No.: 908,447

[22] Filed: May 22, 1978

[51] Int. Cl.³ .................... H02J 7/32; B60L 11/12
[52] U.S. Cl. ............................. 320/61; 180/65 A; 290/16; 290/50
[58] Field of Search .............. 320/61, 62; 290/50, 290/16; 180/65 A

[56] References Cited

U.S. PATENT DOCUMENTS

| | | | |
|---|---|---|---|
| 3,686,549 | 8/1972 | Winebrener | 290/50 X |
| 3,719,881 | 3/1973 | Shibata et al. | 320/62 |
| 3,732,751 | 5/1973 | Berman et al. | 180/65 A X |
| 3,792,327 | 2/1974 | Waldorf | 320/62 X |
| 4,042,056 | 8/1977 | Horwinski | 180/65 A |

*Primary Examiner*—Robert J. Hickey

[57] ABSTRACT

A method for controlling the charging of fast discharge and recharge type propulsion battery components of engine-electric hybrid drive systems for road vehicles, wherein the control objectives are to, minimize discharge of gas through battery cell vents, minimize fuel use, allow employment of a small battery, and provide for long discharge-recharge cycle life, and the control method consists in the steps of, 1—providing so that, if not earlier terminated as a result of operator termination of braking, or a drop in vehicle speed, termination of regenerative braking will be initiated at a point in time determined by a control system generated indication of state of charge just prior to initiation of braking, and the subsequent history of cell current, 2—providing so that, following a partial battery discharge, when and as motor speed allows, supplementary engine implemented battery charging will take place prior to the next advent of regenerative braking, with charge termination made responsive to attainment of a battery voltage per series connected cell that is determined by a control system generated indication of state of charge following discharge, 3—providing to temporarily revert to non-hybrid, engine implemented drive, when cell voltage on battery deep discharge falls below a value that depends in a predetermined way on cell current, 4—when and as service use conditions so warrant, providing to effect increase in battery temperature with use of heat supplied by the engine exhaust, and providing, additionally, to temporarily revert to non-hybrid, engine implemented drive, when, and for so long a period as battery cell internal temperature holds below a predetermined value.

10 Claims, 3 Drawing Figures

METHOD OF CHARGE CONTROL FOR VEHICLE HYBRID DRIVE BATTERIES

FIELD OF INVENTION

The invention has relation to hybrid drive systems of road vehicles of the engine-electric type, wherein it is a function of the battery's charge control system to ensure that the battery is recharged sufficiently rapidly to allow meeting normally occurring discharge requirements, yet not charged to the extent, or in a manner, that causes cell damage effects.

BACKGROUND OF THE INVENTION

In 1971, in the course of examination of results of tests carried out with the process of reference 1, the writer became aware of the fact that, if, in the production of porous nickel substrate type positive electrodes of nickel-cadmium battery cells, the extent of the pore loading was held to two thirds of what is customary in the case of cells of batteries of aircraft type, it became possible to recharge to 95 percent of full capacity in 2 minutes without evidence of gas evolution or cell damage, whereas equally fast charging of more fully pore loaded electrodes to the same state of charge caused early gassing and evidence of electrode damage.

Because of the fast discharge-recharge properties, and the well established long discharge-recharge cycle life of nickel-cadmium batteries, it occurred to the writer, that, with the benefit of reduction in cost that could result from large scale production, nickel-cadmium batteries of reduced pore loading might prove useful as power storage components of hybrid drive systems for road vehicles, such as taxis and within city busses which operate constantly in city traffic.

In August of 1971 the writer met with J. L. Hartman, head of the Electrochemistry Dept. of the General Motors Technical Center, at Warren, Mich., and suggested that nickel-cadmium batteries could prove to be useful as components of hybrid-drive systems for limited market vehicles, including taxis, for which the aspect of low annual production of cadmium would not stand in the way of employment.

In this meeting it came out that General Motors had already carried out studies that indicated the advantages of Ni-Cd batteries as the power battery component of hybrid drive systems of dual battery, all-electric type, but that the factor of high cost, plus limitations as to availability of cadmium, had deflected interest, as see reference 2.

The meeting resulted, however, in a telephone contact with the Air Pollution Office of the Environmental Protection Agency at Ypsilanti, Mich., which had recently sponsored a program of development aimed at producing a power battery that would deliver 55 kw for 10 seconds, and led to the writer being furnished a copy of reference 3, in which mention is made of the potential value of Ni-Cd batteries as power sources for use in engine-electric hybrid drive systems of taxis and busses.

In September 1972 the writer contacted Lawrence Foote of the Ford Motor Scientific Laboratory, who, for some years, had been working on development of electric vehicles, and undertook to develop interest on his part in hybrid drive systems that would employ a nickel-cadmium battery, but that, due to limited availability of cadmium, would require to be used to power limited market vehicles.

Sometime after this conversation, the Ford Motor group that was assigned to work in the area of electric vehicles developed interest in engine-electric type hybrid drives, as a way to protect the limited volume market for large high priced personal use vehicles for which there is especial need to reduce fuel usage per mile.

In due course, that group obtained authority to carry out full-scale dynamometer tests of a hybrid drive system of engine-electric type, and decided, also, to use in these tests, nickel-cadmium cells, that would be produced by the Marathon Battery Co., and that, per the writer's recommendations, would be modified in manufacture, to exclude use of cellophane as a component of the separator, and to incorporate a centrally located plastic spacer that would reduce effective cell thickness, and thereby improve ability to cool.

The results of the tests, which were published in reference 4 were to the effect that, in simulated traffic conditions, a hybrid drive system for a large vehicle utilizing an engine of somewhat less than usual size, and in which it was a feature of the drive system that the engine would stop when the vehicle came to rest, could render it possible to effect a 50 percent reduction in fuel usage per mile of travel.

However, because of the cost and weight of the battery that was employed in the tests, interest developed in investigating a drive system employing a full size engine and a smaller battery which would be called on merely to participate in the acceleration of the vehicle from standstill to around 15 miles per hour, while at the same time starting the engine, and that, in normal operation, would be fully recharged via regenerative braking.

The calculated advantages of this new strategy, in which duration of discharge would typically be held to only 3 seconds are set forth in reference 5, where it was referred to as Ford B strategy, comprised a fuel economy superior to that found with use of the cycle that had been tested and reported on in reference 4, which was identified in reference 5 as Ford A strategy.

Of special interest to the writer was the fact that, in Table IV of reference 5 the overall efficiency of a taxi in conventional drive is given as 0.074, while for hybrid drive with use of the Ford B strategy it is given as 0.199, which implies that a hybrid drive of Ford B strategy type would use only $(0.074/0.199) \times 100 = 37.3$ percent as much fuel as would a conventional taxi and hence would improve fuel economy by 62.7 percent.

Following the tests described in reference 4, the Ford Scientific Laboratory decided to determine, by test, how well lead-acid batteries would perform with use of the new strategy.

However, after the writer brought out that,
 (a) in fast cycling tests of small experimentally produced cells, which were first discharged for 3 secs. and thereafter at once recharged for 3 secs. at a rate that would correspond to use of a 160 pound vehicle battery, a cycle life in excess of 400,000 had been achieved, with absence of need to vent internally generated gas,
 (b) increase in current density by a factor of two, which would correspond to a battery of 80 pounds weight neither caused gassing nor reduced discharge-recharge efficiency below 75 percent,
 (c) in the tests a flooded cell had been used in which the active material content of the pores of the positive electrodes per unit of area was 56 percent of the figure that typically applies to a typical commercial aircraft battery, (d) it might be found possible to reduce the cadmium content of negative electrodes, and further reduce the active material content of positive electrodes, Ford Motor issued to Battery Development Corp. of New York, N. Y., for which firm the writer's studies of nickel-cadmium batteries were being conducted, a Request for Quotation (6)* covering production of a pair of 24 volt low energy, but high power density nickel-cadmium batteries that would utilize a minimum amount of cell active materials, and that would be intended to meet performance requirements as below:

(a) Accept 9 to 18 kw of power over a 6 second period.

(2) Rest 20 seconds.

(3) Deliver 12 kw of discharge power for 3 seconds. Rest 21 seconds.

(4) Over a 3 second period deliver power at a rate that will suffice to maintain constancy of state of charge over a large number of charge-discharge cycles.

(5) Rest 20 seconds.

(6) Next repeat the above cycle and thereafter continue to repeat, with the state of charge that would be maintained from cycle to cycle being chosen such that, on occasion, the battery, when called on to do so, would be able to deliver two 18 kw, plus three 12 kw, power pulses each of 3 seconds duration, absent any charging between discharges.

(7) Anticipated weight 80 pounds including no more than 1½ lbs. of cadmium.

(8) Anticipated life in excess of 100,000 cycles.

*Numbers in parenthesis refer to numbered items in table of reference.

On receipt of a copy of the Request for Quotation, the writer initiated laboratory production of two inch by two inch positive and negative electrodes that were low pore loaded to varying extents, and next proceeded to carry out tests with use of the test cycle called for, the intention being to verify what was feasible and give consideration to possibly patentable concepts prior to quoting.

The writer perceived three possible areas of this type, as below, (a) employment of other than usual electrode pore loadings, (b) best electrode and cell configuration, (c) devising a charge control scheme that would avoid cell damage due to gas evolution as a result of overcharge, yet that would also provide so that requirements (2), (6) and (8) above could be met.

As matters turned out the writer, before long, concluded from test results, that low, though not as low as called for, negative electrode pore loading, would be feasible, and also that a new cell configuration could prove advantageous.

But there remained the problem of how to control charge processes in a way that would take account of the fact that, under conditions of use, the operators of hybrid drive type vehicles will fail to apply pressure to the vehicle's accelerator and brake pedals in any consistent or predictable manner, but, rather, will perform these functions in variable ways, dependent on the exigencies of traffic, in which connection it is worth noting that the Ford Scientific Laboratory personnel that had charge of the previously referred to dynamometer tests, found it necessary, in those tests, to provide to manually terminate charging in response to visual evidence of rapid evolution of gas within the cells (7).

When it comes to techniques for fast charging nickel-cadmium batteries, published material that has come to the writer's attention has made reference to "dump-timed" charging, in which a battery is first fully discharged and thereafter charged for a predetermined time at a constant rate, which technique, per reference 8, has been used to "charge sealed nickel-cadmium cells up to 40 percent of rated capacity in about 3 minutes", while reference 9 cites ability to charge fully discharged cells of sealed nickel-cadmium type to ¼ of rated capacity in one minute.

However, reference 8 states also that "dump timed" charging can be used only with single cells "because dump discharging a multicell unit would permanently damage the battery if individual cells were driven into reversal".

As a solution to the problem of avoidance of damage of one or more of a group of series connected nickel cadmium type cells due to cell reversal, while, in one approach damage, can be avoided by automatically terminating battery discharge when voltage falls below a sufficiently high value that depends on cell current, where, as in the case of hybrid drives for vehicles, capability for deep discharge is especially important, the writer proposes to employ, in addition, a protective technique developed by NASA's Marshall Space Flight Center in accordance with which a multiple output type of dc to dc converter is utilized as a way to constantly provide for cell equalization under conditions of battery use (10).

When it comes to operation of hybrid drive vehicles in traffic, if, as can sometimes occur, traffic moves very slowly, for a long enough period, it is inevitable that the state of charge of the battery of an engine-electric drive system using the Ford B strategy will be so much reduced that it will be necessary to provide for the operation of the vehicle's drive system to revert to conventional drive in which the engine can operate when the vehicle is at rest, and would be caused to do so long enough, and at sufficient speed, to effect rapid recharge of the battery.

However, from the standpoint of fuel economy it would be undesirable that reversion take place other than infrequently, which being the case, the desirability of inclusion of a discharge capability requirement along the lines of item 6 of the Ford Motor Request for Quotation is indicated.

On the other hand, the concept contained in the Ford Request for Quotation, to the effect that, per item 4, it would be planned to accept, in 6 seconds, more energy via regenerative braking than would be given up by the battery during a 12 kw discharge lasting 3 seconds, while offering advantages from a fuel saving standpoint, in practice has the effect of requiring use of a larger battery than would be needed merely to meet discharge requirements, and for this reason deserves to be viewed as of questionable merit.

On this score the writer concluded that, in the interest of holding battery weight low, it would be desirable to plan testing on the basis of employment of a battery primarily sized to meet discharge requirements, and this approach to design of an engine-electric hybrid drive system, is adhered to in the preferred embodiment portion of the present application.

When charging of either a nickel-cadmium or lead-acid battery first begins after entire discharge, gas evolution does not at once occur, provided that the magnitude of charge current is sufficiently restricted. However, when, during a charge process, state of charge is allowed to exceed a value that depends on battery type, and may also depend on cell internal temperature, gassing occurs even if rate of charge is small, while, as state of charge progressively increases, need to restrict charge rate increases, if undesirably rapid gas evolution, and reduction of discharge-recharge efficiency is to be avoided.

In employment of a nickel-cadmium battery in hybrid drive systems for vehicles, because of fast discharge-recharge requirements, employment of sealed cells, either of the widely sold cylindrical type or the rectangular plate type employed in space vehicles, in both of which only enough electrolyte is employed to dampen the electrode separators, is viewed by the writer as impracticable and therefore, employment of flooded cells, or cells that would be nearly fully flooded has been planned.

However, in the case of such cells, in order to avoid, or, at any rate, hold to a minimum, need to periodically add water to cells, and also avoid undesirable change in the relative state of charge of the cell's positive and negative electrodes, it is desirable to devise and provide to employ a type of charge control system that holds rate of gas evolution within the cell during charge low enough so that, over a period of time, whatever gas has been generated during charging and has found its way into the space above the electrolyte is reabsorbed into it, where, if it is oxygen, it can diffuse to and react with the cadmium of the negative electrodes, and if it is hydrogen, can diffuse to and react, even if only slowly, with the active material of the positive electrodes, and do so notwithstanding the fact that unlike what applies in the case of the sealed cells of commerce, and those used in space craft, access of gases generated within the cells to the electrodes is largely diminished due to the fact that the electrodes are either fully or nearly fully submerged, and the further fact, that, in use of a small battery, in hybrid drive that employs regenerative charging very rapid charging up to a predetermined state of partial charge is called for.

Though the writer is unaware of any prior art in this area the writer's tests have shown that devising a charge control system that will meet these requirements is feasible, provided that, as in the case of flooded porous plate type nickel-cadmium cells, of aircraft type, the cells are provided with pressure relief type vents which operate to hermetically seal the cells so long as cell internal pressure holds below a predetermined value, yet allow discharge of gas in case of control system malfunction, which, in turn implies that aircraft type nickel-cadmium cells can be made use of in hybrid drive systems for road vehicles, with normal absence of discharge to atmosphere of internally generated gases, though, as previously noted, it has appeared that there can also be advantages in employing low pore loadings and a new type of cell configuration.

When it comes to spacecraft type sealed cells it is well known in the art pertaining to their production and use that it is important to ensure that when their electrodes are assembled into them the extent of precharge of the negative plates, by which is meant the extent of charge of those plates when the positive plates have been fully discharged, expressed as a percentage of positive plate charge capability, is suitably controlled (11), though this requirement has been examined only for the case of cells that, in use, would normally be largely or fully charged, and there appears to be no evidence of published information that applies in the hybrid drive case, or at any rate to a hybrid drive of the Ford B strategy type in which maximum state of battery charge is held low.

However, the writer's tests well demonstrated that it is necessary to see to it, that, under typical hybrid drive vehicle use conditions the relative states of charge of the positive and negative electrodes is suitably controlled, and, insofar as possible, stabilized.

In one approach it would be possible to arrive at a solution to this problem in the manner set forth in the last paragraph of reference (11), but this would introduce prohibitive cell cost in a hybrid drive application, and would fail to provide for cell stabilization.

In this area it is an aspect of the present invention that it discloses a relatively simple way to achieve desired control of state of charge of electrodes in a largely stabilized form, which comprises slowly charging cells, while venting internally generated gas, until both the positive and negative electrodes are fully charged, and next vacuumizing and filling with nitrogen.

As to prior art the writer has noted that on page E-59 of reference (12) mention is made of effecting nickel-cadmium cell state of charge adjustment "by a hydrogen or oxygen venting technique established by the seller" (ie. by the cell producer), but further details are not supplied. Also, on page 3-3 of reference (12) the statements are made "precharge is set by electronically discharging at a 0.075 ampere rate (power discharging) the full negative group against the cell container"

a very slow process that, in any case, would not be applicable where a plastic cell case was employed.

Also another statement on the same page reads to the effect that after vacuum tests "The cells are back filled with an oxygen-helium mixture" a mixture of gases that clearly is not inert.

Accordingly as far as the writer knows fully charging, vacuumizing and then filling with an inert gas represents a heretofore not used, and, as it would appear, non-obvious technique.

Also, while the problem of providing so that, in regenerative charging of batteries of hybrid drive systems for road vehicles, enough motor voltage can be generated to cause power to flow into the battery has been approached in a variety of ways, including automatic battery reconnection from a series to a parallel connection of two equal groups of cells (15, 16), use of a chopper type voltage booster (13, 14), and control of generator field current (13, 15, 16, 17), in the case of published materials that have dealt with regenerative braking that have so far come to the writer's attention, none have given consideration to automatic controls that would, (a) provide for avoidance of cell damage due to too rapid or too long continued regenerative braking, and, (b) at the same time operate to minimize delay in restoration of battery discharge capability following deep discharge, despite the fact that employment of a control system that will serve these purposes appears to be essential to ability to effectively employ, in a road vehicle equipped with an angine-electric type hybrid drive system, a propulsion battery that is both low in weight, and that will exhibit favorable performance and long discharge-recharge cycle life under service use conditions.

The present invention is directed to providing an answer to problems in these areas.

While by far the bulk of the writer's experimental studies have been confined to nickel-cadmium batteries, it appears that what the present disclosure teaches will prove to have useful application to hybrid drive systems for vehicles that would use a battery of lead-acid, nickel-iron, and nickel-zinc types, and it is further viewed as probable that the same would prove to be true in the case of any other types of batteries that would prove to be adaptable to use as fast discharge-recharge components of hybrid type vehicle drive systems.

SUMMARY OF THE INVENTION

The present invention relates to methods of controlling the charging of fast discharge recharge type propulsion battery components of engine-electric hybrid drive systems for road vehicles, in which the battery is called on to, (a) supply power for accelerating the vehicle, and (b) accept charge when the vehicle is being braked, wherein the charge control system operates to avoid charging the battery to an extent and at a rate that would accelerate deterioration of performance with time under conditions of use.

A main object of the invention is to allow employment of as small a battery as feasible without undue reduction of discharge-recharge cycle life under use conditions.

Another object is to provide so that, in the case of nickel-cadmium batteries, there will be little or no discharge of internally generated gas through pressure relief type cell vents over the life of the battery.

A further object is to provide for high battery discharge-recharge energy efficiency under conditions of vehicle use in traffic.

Still another object is to provide an automatic charge control system that will rapidly restore battery discharge capability following a deeper than normal discharge.

DESCRIPTION OF THE PREFERRED EMBODIMENT

Figure 1:
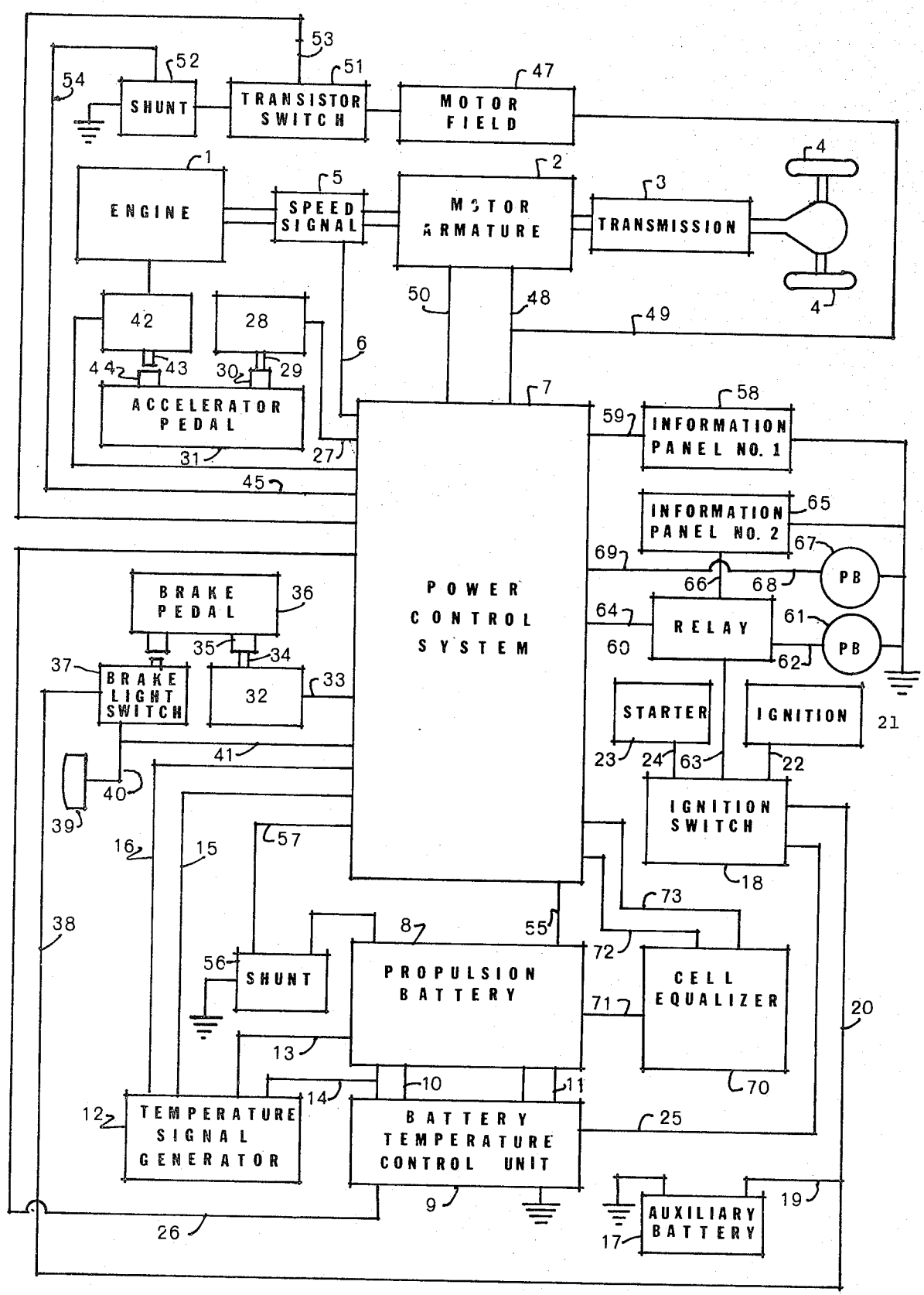
FIG. 1 is a schematic block type diagram of the components of a hybrid drive system of the engine-electric motor battery type.

FIG. 1 shows schematically a preferred embodiment of an engine-electric hybrid drive type propulsion system for a road vehicle, which incorporates an engine 1, direct connected to the armature of a separately excited d.c. motor 2, which connects, in turn, to a gear shifting transmission 3, which makes connection to the vehicle's rear wheels 4, via a propeller shaft, differential and pair of axles.

Whereas the engine, motor and transmission, which last is to be understood to include a clutch, are shown to be directly connected, optionally the motor can be coupled to the engine by a gear or belt.

Element 5 comprises a speed signal generator, which provides a rectified and smoothed out a.c. voltage type signal proportional in magnitude and frequency to engine and motor speed, that is transmitted via a pair of leads 6 to power flow control system 7 which controls the flow of power from propulsion battery 8.

Element 9 comprises a battery temperature control unit which is to be understood as being arranged to supply, to battery 8, through conduit 10, air that is either of ambient air temperature, or that has been heated.

Conduit 11 provides for return of air to element 10, so as to allow recirculation when called for.

Though not shown it is also to be understood that a thermistor enclosed within a protective tube is centrally located within at least one of the cells of battery 8, and that another is located in thermal contact with the air flowing through conduit 10, and that these thermistors make connection over leads 13 and 14 respectively to thermistor controlled temperature signal generator 12, which receives power at a regulated voltage, from control system 7 over a pair of leads 15, and transmits voltage signals indicative of battery cell internal and heating and cooling air temperature to control system 7 over multiple conductor lead 16.

Element 17 represents an auxiliary battery of vehicle starting and lighting type, possessing a capability for supplying normal vehicle auxiliary power needs, as also for starting the engine when and as vehicle operation without employment of hybrid drive either automatically takes place, or is operator elected.

Auxiliary battery 17, one terminal of which is grounded, can be seen to make connection to ignition switch 18 via leads 19 and 20.

Ignition switch 18 is to be understood to be arranged, as usual, so that it will energize ignition system 21 over lead 22 when a key that fits the vehicle's lock has been inserted, and the ignition switch turned to its "run" position, and to energize engine starting system 23 over lead 24 when further rotated.

Also, when closed, ignition switch 18 supplies power to air heater and cooler 9, which incorporates a motor driven blower and control element, one side of which makes connection to ground, the connection being via lead 25, while control of power flow within element 9 is effected from control system 7 over multiconductor lead 26.

In addition to receiving a signal input from element 5, power controller 7 makes connection, over a pair of leads 27, to variable resistor 28, the movable contact of which is driven by a linear drive element 29 which is spring loaded to bear against drive element 30 that makes connection to and is moved by accelerator pedal 31, provided that that pedal is not too greatly depressed, the arrangement being such that the resistance of resistor 28 increases as accelerator pedal 31 is depressed, and reaches its maximum value when drive element 29 reaches the end of its stroke, at which point drive elements 29 and 30 separate, while also the resistance of element 28 decreases to zero somewhat before pedal 31 reaches the position that it assumes when no pressure is applied to it.

Also controller 7 receives a voltage signal from potentiometer 32 over 2 wire lead 33.

The moving element of potentiometer 32 is driven by a linear drive element 34 which is spring loaded to move it in a direction to increase the value of the voltage output signal of the potentiometer up to the point at which drive element 34 attains its maximum stroke.

However, motion of drive element 34 is resisted as a result of contact with drive element 35 that makes connection to and is moved by brake pedal 36, until that pedal has been sufficiently depressed, at which point drive elements 34 and 35 separate.

Also when pressure on brake pedal 36 is relaxed, and as a result the pedal moves toward the operator of the vehicle, the voltage signal output of potentiometer 32 will decrease, the arrangement being made such that this voltage will become zero before the pedal has reached a position at which the vehicle's brake light switch 37, which receives power over leads 19 and 38 and delivers power to brake light 39 and controller 7 over leads 40 and 41, will have opened, yet, because of overtravel capability built into drive element 34, it will result that when the brake pedal fully retracts and comes to rest, the force that is required to restrain it in that position will not be borne by element 34.

To avoid waste of valuable vehicle stored energy of motion during braking, it will be provided that mechanical braking will only begin to take place after elements 34 and 35 have separated.

While it is possible to employ a conventional rotating shaft type variable resistor and potentiometer it seems not unlikely that a linear motion type, of which commercial versions are available, (18) would represent the best choice.

Besides driving resistor 28, accelerator pedal 31 also exercises control over carburetor 42, via drive element 44, which is connected to and moves with pedal 31, and carburetor drive element 43 which is spring loaded to close the throttle of the carburetor, the stroke of element 43 being such that element 44 bears on it only when pedal 31 is sufficiently depressed.

In addition carburetor 42 is to be understood to incorporate provision such that, in response to receipt of electrical power input over lead 45 it will fully close its throttle, prevent flow of fuel through its idling nozzle, and open a by-pass that admits air between the throttle and the engine, thereby cutting off fuel, with this control action canceled when power input over lead 45 is terminated (19).

Power control system 7 supplies power to one side of both motor armature 2 and motor field 47, via leads 48, and 49 respectively.

The other side of motor armature 2 connects to power control system 7 over lead 50, while the other side of motor field 47 connects to ground via transistor switch 51 and shunt 52, while transistor switch 51 is controlled from power control system 7 over lead 53, and shunt 52 transmits a voltage signal to control system 7 over dual lead 54.

The positive terminal of propulsion battery 8 makes connection to power control system 7 over lead 55 while the negative terminal connects to ground via shunt 56 the voltage across the latter being transmitted to power control system 7 over dual lead 57.

Element 58 comprises operator information panel #1, which, when energized from power control system 7 over lead 59 illuminates and advises the operator that the vehicle has temporarily reverted to non hybrid operation.

Element 60 comprises a commercially available (22) type of relay, which, as will be subsequently more fully explained in the course of examination of FIG. 3, responds to momentary depression of push button 61 that makes connection to the relay over lead 62, by magnetically latching closed a pair of contacts that connect leads 63 and 64. Also it will open those contacts and close another set that connects lead 63 to operator information panel 65, over lead 66, when either push button 67, which connects to the relay by lead 68, is momentarily depressed, or when lead 69 makes connection to ground through a transistor, not shown, located within power control system 7.

Push buttons 61 and 67, which would be located where the vehicle operator has easy access to them, provide the operator with opportunity to optionally elect either to retain hybrid drive operation in use or revert to conventional drive should problems develop in its use.

Also, via lead 69, power control system 7, when programmed to do so can cause reversion from conventional to hybrid drive on a sustained basis in response to specific internal hybrid drive problems.

Element 70 is a cell equalizer that makes connection between individual cells of battery 8 over multiconductor lead 71 and to power control system 7 over lead 72 and dual lead 73.

As will be later explained, equalizing unit 70 will, as called for, selectively supply limited amounts of charge to individual battery cells over multiconductor lead 71 as a way to maintain equality of cell voltages.

The propulsion batteries must be chosen to be of a type that can be rapidly partially recharged, yet that will, nonetheless, exhibit adequate discharge-recharge cycle life relative to replacement cost, and, in what follows are assumed to be of nickel-cadmium type.

Low battery internal resistance is useful not only from the standpoint of discharge-recharge energy efficiency, but, also, to help avoid discharge to atmosphere of hydrogen and oxygen evolved within the cells.

Employment of commercially available sealed nickel-cadmium cells, which have high internal resistance, would present problems.

However, the writer's tests of flooded two inch by two inch electrode dimension commercial nickel-cadmium cells, equipped with pressure relief type vents, have demonstrated that avoidance of discharge of gas to atmosphere in the course of hybrid drive cycles can be achieved with use of a suitably worked out charge control system.

On the other hand, it is thought that, though continuous cell pressure increase was avoided despite use of flooded cells, the point could apply that in use of cells incorporating electrodes of greater than two inch vertical dimension extent of flooding could require to be restricted as a measure needed to allow use of a small battery.

Looking to the future the writer's studies have suggested that it will prove to be possible to employ a new type of porous electrode nickel-cadmium cell that would exhibit exceptionally low internal resistance, and that, also, in the interest of minimizing battery cost, could employ an active material loading of the pores of the cells lower than that employed in presently commercially produced cells.

To allow use of a small propulsion battery, without adverse effects due to gas evolution, and at the same time achieve favorable discharge-recharge energy efficiency, it is desirable to provide, so that, insofar as possible, battery temperature will be held within a preferred range of values under conditions of vehicle use. This can be accomplished via circulation of air supplied by propulsion battery cooling and heating unit 10, which, for cooling purposes, utilizes ambient air direct, and when heat is needed, air heated by contact with either the exhaust pipe of the engine, or by passage through a water to air heat exchanger through the water side of which hot engine cooling water is caused to pass, or if the vehicle is not in use, and, in cold weather, when feasible, by contact with electric heating elements that receive their power from a power source outside the vehicle.

To avoid undue delay in transfer of heat into the interior of the battery provision needs to be made in its design so that the spacing from a cell array exterior surface to the electrode located farthest from that surface is not excessive, which, in the writer's view, implies that this distance preferably would not exceed one inch.

Range of lead-acid and nickel-cadmium battery cell internal temperature judged to be best adapted to ensure favorable battery performance is presently thought to be 40 to 45 degrees centigrade.

To further ensure ability to successfully employ a small battery it requires to be provided that charging will be prevented when cell internal temperature is below a value representing a desirable lower limit in hybrid drive use, which temperature, in the case of nickel-cadmium batteries, as it presently appears, will prove to be in the range of 25° to 30° C., though lower figures will doubtless prove to be allowable if provision is made so that, when temperature falls below this range, use made of regenerative braking is sufficiently restricted.

When it comes to cell internal temperature, the temperature of greatest interest is that applying in the case of cells most likely to be coolest in cold weather, which implies that the battery 8 thermistor needs to be located within the electrode bundle of a cell selected with this in mind.

A cell can be designed to receive a thermistor, located within a protective tube, by reducing the number of electrodes enough to leave the necessary space for insertion.

In the case of a lead-acid battery, the necessary space can be provided by eliminating either one positive or one negative electrode and replacing it, and one separator, by a sheet of polypropylene of appropriate thickness having a slot cut in it to allow for entry of the protective tube of the thermistor which would preferably be constructed of stainless steel covered over with shrunk on high density polyethylene, or polypropylene, tubing.

In the case of a porous plate type nickel-cadmium battery, the same protective tube arrangement can be used, but it will be necessary to remove two positive electrodes, and one negative, or, otherwise, two negatives and one positive.

When it comes to battery temperature controller 9, it would not appear to be necessary to describe any one of various forms that it could take, since in the motor vehicle industry there are experts on vehicle heating that can be relied on to devise a suitable equipment. However, in designing such a system, it would be desirable that it would be arranged to incorporate provision so that, if the internal cell temperature of propulsion battery 8 was initially below a preset value, as say, below that value which, unless exceeded, would be arranged to prevent battery charging, the air heater control system would bring into effect a higher circulating air temperature than would be provided for were the battery's cell internal temperature normal.

For example, if the battery were sufficiently cold, and if polypropylene represented the choice of cell case material, when the battery is cold the temperature of heating air could be regulated to as high a figure as 100° C. without cell damage, the effect being to speed up increase in cell internal temperature.

But as cell internal temperature approached its optimum range of values, which is presently thought to be 40° to 45° C., circulated air temperature would be reduced, optionally with provision that both heated air and air of ambient air temperature would be circulated, sequentially, as a way to attain desired control.

Since individual cells of a nickel-cadmium battery can be damaged on deep discharge if the ability of some cells to deliver charge is significantly less than the average applying to all cells, when propulsion battery 8 is of nickel-cadmium type it is desirable to both limit depth of discharge and provide a means of cell equalization.

Limitation of depth of discharge is readily accomplished by terminating discharge when average cell voltage decreases to or below a preset value that depends on cell current.

However, even a relatively high discharge termination voltage will not protect a battery over its potentially useful life, in the absence of provision for cell equalization.

On the other hand, with use of provision for cell equalization of the type described in reference 10 it is safe to fully discharge nickel-cadmium batteries if the discharge is effected slowly enough, and it seems reasonable to expect that, with use of properly sized equipment, rapid discharge of the type used in vehicle propulsion to a voltage level of 0.8 volts per cell would fail to adversely affect cell life, and especially if a discharge of this depth takes place only infrequently.

When it comes to temperature signal generator 12, this could comprise a pair of conventional bridge circuits one for each of the two thermistors that make connection to item 12 via leads 13 and 14 respectively with power supplied over dual leads 15, and output voltage signal received by power controller 7 over lead 16 which would incorporate 4 conductors, two for each output.

Figure 2:
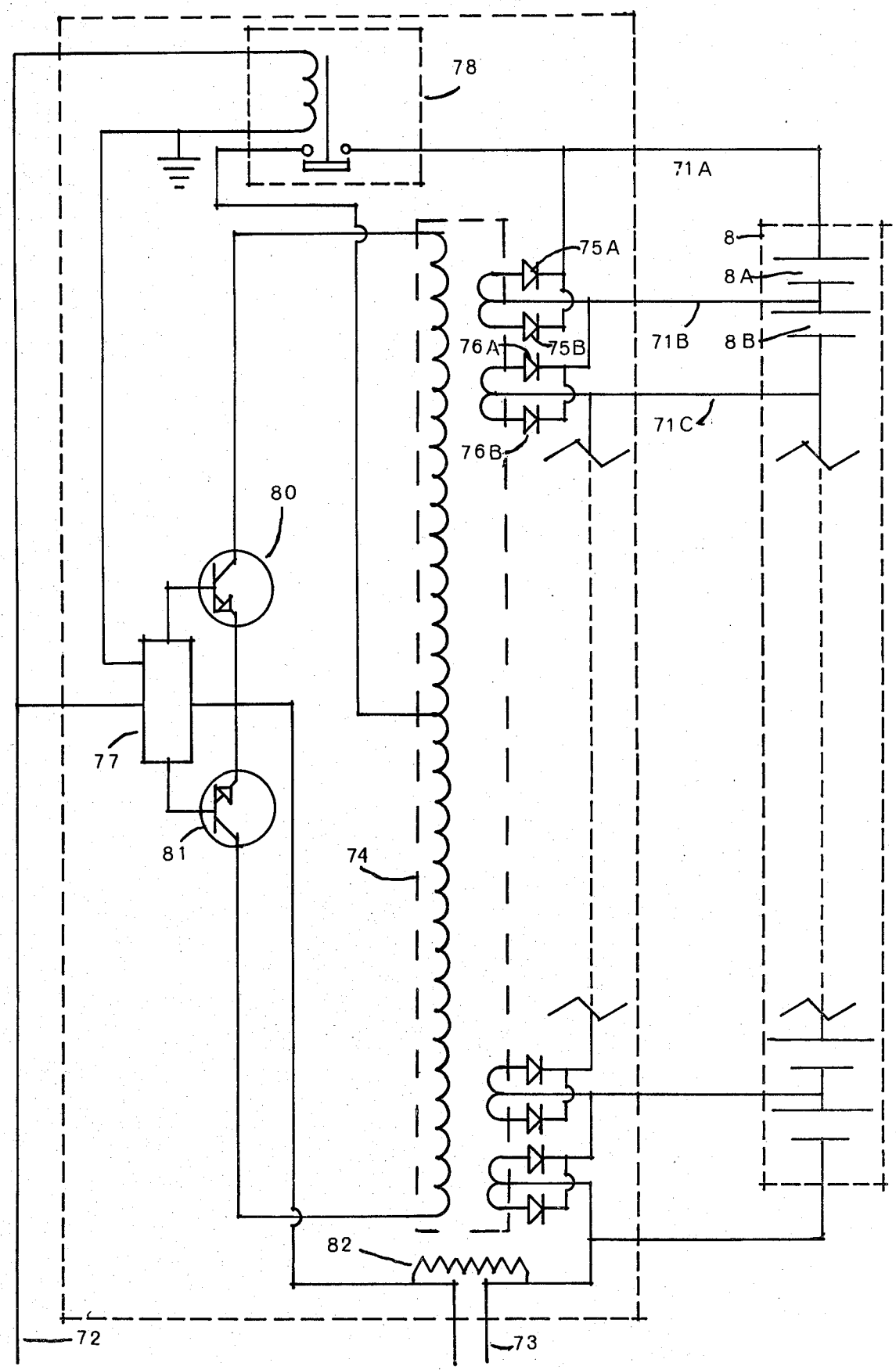
FIG. 2 is a schematic view of the circuitry of the cell equalizing component shown in FIG. 1.

FIG. 2 sets forth, schematically, the electrical features of cell equalizer 70 which, as shown, in accordance with FIG. 1, makes connection to the individual cells of propulsion battery 8 over multiple lead 71, incorporating leads 71A, 71B, 71C etc.

Cell equalizer 70 which, as shown, is essentially identical with the simplified representation of a nickel-cadmium battery reconditioning unit shown in FIG. 5, of reference 10, comprises a multiple output type of dc to dc converter which incorporates a single primary, multiple low voltage secondary winding rectifier type transformer 74 with the outermost turns of the secondary winding that is shown uppermost in FIG. 2 making connection via diodes 75A and 75B to the positive plate of cell 8A of battery 8, and the mid point of that secondary winding making connection to the negative electrode of that cell.

Similarly the next in line secondary winding makes the same type of connection of cell 8 B, with connection to the positive electrode of that cell made through diodes 76A and 76B, and so on, down the line, until the last secondary winding makes connection to the last cell.

Item 77 comprises an oscillator which receives power over lead 72 which when energized also serves to energize and close the contacts of power relay 78, which, in turn, causes the primary of transformer 74 to be excited, via the operation of transistor switches 80 and 81 at a frequency determined by oscillator 77.

Element 82 is a shunt to which dual leads 73 make connection, and, through these leads, communicates to power control system 7 a voltage signal that is indicative of the current drain on the battery that develops as a result of operation of the cell equalizing system, and that can be utilized to provide a warning to the operator of the vehicle when the problem of cell equalization is becoming difficult.

The step down ratio of the primary of transformer 74 to its several secondaries needs to be chosen so that, when all cell voltages are equal, the current flowing in shunt 82 will be low. However, just what ratio will be advantageous will best be found by trial of different ratios under typical service conditions, and it would be desirable to provide taps on the transformer primary to allow a choice of ratio, which, in practice could perhaps desirably change over the life of the battery.

Figure 3:
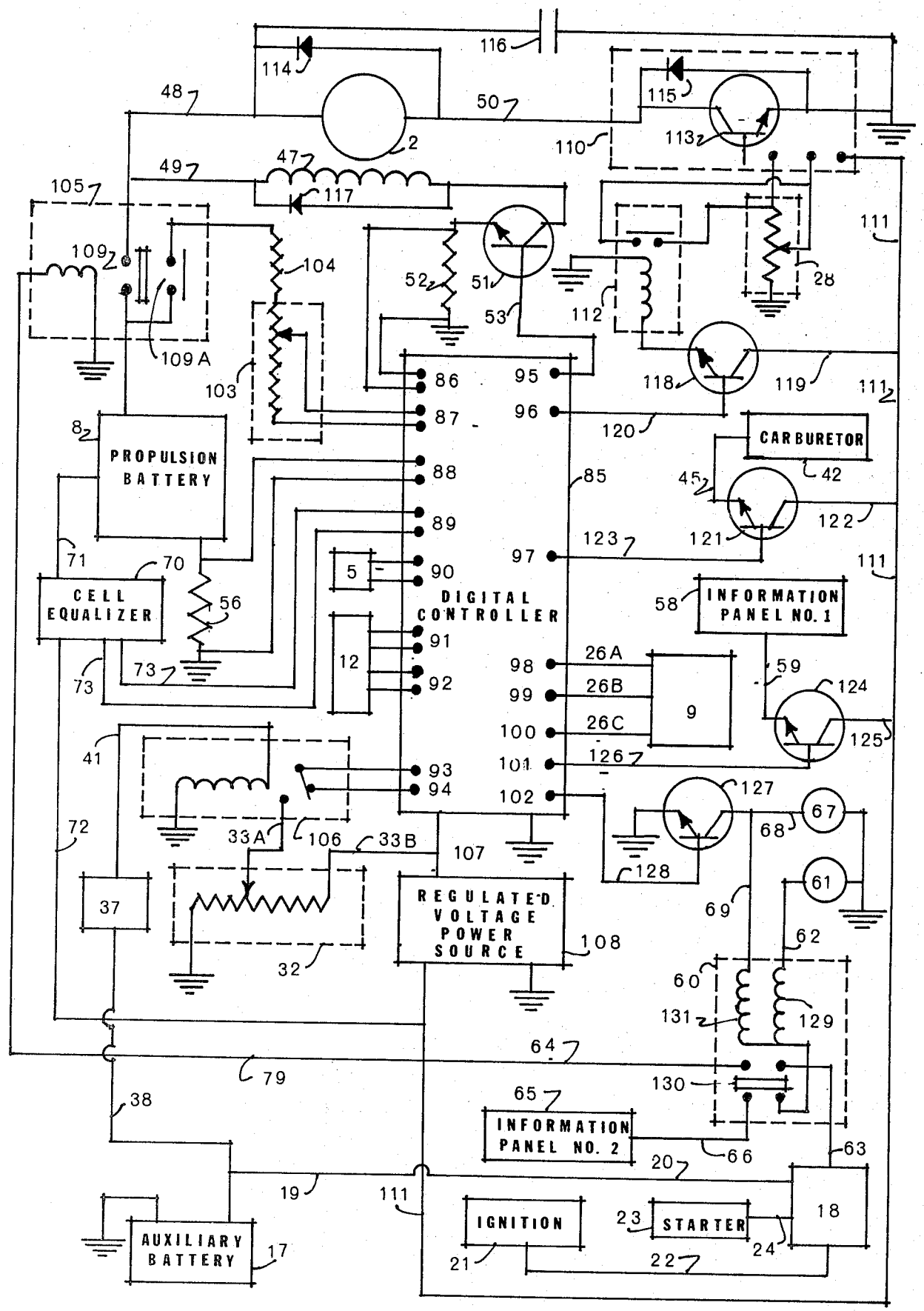
FIG. 3 comprises a diagram of the circuitry of the vehicle's control system in which details are more fully shown than in FIG. 1.

Referring to FIG. 3 numbered elements beginning with 85 comprise what the writer has termed the vehicle's power control system, shown as element 7 in FIG. 1.

A key element of power control system 7 is digital controller 85 which is to be understood to be equipped to receive differential voltage inputs over input terminals 86 through 92, and after passing them through differential operational amplifiers, not shown, generate single voltage inputs amplified in controllable amount, and to also receive a single voltage input at input terminal 93, and to yield as an output an internally generated analog signal at terminal 94, and deliver digital type output signals at output terminals 95 through 102.

Input terminals 86 receive as an input the voltage across shunt 52. Input terminals 87 receive as an input the voltage output of manually set potentiometer 103 which connects across battery 8 through resistor 104 when auxiliary contacts 109A of contactor 105 close.

Input terminals 88 receive the output of shunt 56. Input terminals 89 make connection to dual leads 73 of cell equalizer 70 which connect across shunt 82 shown in FIG. 2.

Input terminals 90 receive, over leads 6, a voltage developed by motor speed signal generator 5.

Input terminals 91 and 92 receive from temperature signal generator 12 voltage signals related to internal cell temperature of battery 8 and the temperature of the circulating air that leaves battery heating and cooling unit 9.

Input terminal 93 receives a voltage signal which, by virtue of single pole double throw relay 106, which is shown in its deenergized position, receives as a voltage signal the analog output of terminal 94, so long as relay 106 is deenergized.

Relay 106 is deenergized when there is no pressure on the vehicle's brake pedal, but when the pedal has been depressed enough to light the vehicle's stop light as a result of closure of the contacts of stop light switch 37, shown in FIG. 1, relay 106 is energized over lead 41 and causes the movable contact of potentiometer 32 to make connection to terminal 93 over lead 33 A. Since the other wire of lead 33, namely 33 B, connects to lead 107 which makes connection between regulated voltage power source 108 and digital computer 85, the effect is that, with the vehicle's brake pedal depressed, the voltage at input terminal 93 is determined by the position of the movable contact of potentiometer 32, and hence by brake pedal position.

When lead 64 is energized the operating coil of contactor 105 receives power over lead 79, with the effect that the positive end of propulsion battery 8 makes connection to one side of motor armature 2 and one side of motor field 47 via leads 48 and 49, respectively, due to closure of the contactor's main contacts 109, while at the same time auxiliary contacts 109A will close, thereby applying voltage to potentiometer 103. Also, at the same time, cell equalizer 70 will be energized and begin to function.

The other side of motor armature 2 makes connection via lead 50 to solid state type motor armature current controller 110, which receives power needed for control purposes over lead 111.

Motor armature current controller 110 is subject to the control of variable resistor 28 and relay 112.

With relay 112 energized resistor 28 is shorted out and transistor 113 will pass no current.

However, with relay 112 deenergized transistor 113 will pass pulses of current at a predetermined pulse frequency, with pulse width determined by the resistance of resistor 28.

Element 114 comprises a so-called free wheeling diode which provides a path for the continued flow of motor armature current when transistor 113 suddenly transfers from the conducting to the non-conducting state.

Element 115 is an additional diode needed to allow the motor, acting as a generator, to supply charging current to propulsion battery 8.

Element 116 is a capacitor, the purpose of which is to limit the extent of pulsation of battery current during processes of motor control.

Further details as to the construction of motor armature current controller 110 are omitted since units that will perform needed control functions are commercially available (20).

Element 51 is a Darlington transistor switch of commercially available type (21) which is controlled from output 95 of digital controller 85 received over lead 53.

Motor field current enters the motor field 47 via lead 49, and, when transistor switch 51 permits, passes through it and also through shunt 52 to ground, while when switch 51 suddenly ceases to accept current it continues to flow briefly through free wheeling diode 117.

Transistor switch 118 receives power over leads 111 and 119, and, when signalled to conduct via a digital signal received from output terminal 96, over lead 120 energizes relay 112 which then closes its contacts thereby shorting out resistor 28.

Similarly transistor switch 121 receives power over leads 111 and 122 and when signalled to conduct via lead 123, which connects to controller 85 output terminal 97, transmits power to carburetor 42 over lead 45.

Leads 26 A, 26 B and 26 C receive digital signals from terminals 98, 99 and 100 of controller 85 and transmit them to propulsion battery heating and cooling unit 9.

Transistor switch 124 receives power over leads 111 and 125 and transmits power to element 58, comprising operator instruction panel #1, over lead 59, when signalled to do so over lead 126, which makes connection to controller output terminal 101.

Transistor switch 127 receives power over lead 69 and connects that lead to ground when signalled to do so over lead 128 which makes connection to terminal 102 of controller 85.

In the case of contactor 60 which receives power from auxiliary battery 17 over leads 19, 20, and 63, when ignition switch 18 is turned to the "run" position, momentarily depressing push button 61 energizes the relay's lockup coil 129 to raise contact bridging member 130 from its normally low position and hold it up in a magnetically latched manner so that it makes connection between leads 63 and 64.

With bridging member 130 latched in place connection between leads 63 and 64 will continue even if lead 63 is deenergized which means that, when lead 63 is reenergized there will be no need to depress push button 61 in order for hybrid drive to resume.

However, if controller 85 causes transistor switch 127 to conduct, or if push button 67 is momentarily depressed, quick acting release coil 131 will be energized and bridging member 130 will open the connection between leads 63 and 64 and connect lead 63 to element 65 comprising operator instruction panel #2, which will thereupon illuminate on a sustained basis and inform the operator of the vehicle that there is something wrong with the hybrid drive system and hence that the services of a trouble-shooter are needed, while also, since lead 111 as well as the balance of the hybrid drive system will be deenergized flow of current to carburetor 42 over lead 45 will terminate, which then will ensure admission of fuel to the engine until hybrid drive is reinitiated, and therefore the vehicle will automatically revert to conventional drive on a sustained basis.

It is to be understood that digital controller 85 will incorporate operational amplifiers in input circuits, where needed, provision for analog to digital conversion, microprocessors, memory systems, and whatever else may be needed to enable it to initiate control operations of types that will be described further on, in a following section of this disclosure headed "Mode of Operation".

Since it is well known that those skilled in the art of digital control are able to program versatile digital controllers so that it will perform complex forms of control, it is not viewed as necessary in the disclosure of the present invention to illustrate, by way of example, the details of how software would be developed.

Rather it is viewed as adequate to list the functions that controller 85 would be required to perform, and leave the working out of the software to those who specialize in the area of computer implemented control.

When it comes to desirably conditioning the battery for use what is needed relates to the fact that the discharge capability of a cell can almost disappear, if, due to too great access to oxygen, the negative electrodes become sufficiently discharged, with the positive electrodes remaining charged.

However, the writer has determined that this problem, which is typically accompanied by undesirable instability of cell internal pressure, can be largely overcome by first fully charging both the positive and negative electrodes of the cells, with release of internally generated gas to atmosphere, with charging carried out at a current equal to one-fifth of the ampere hour capacity that the electrodes would have if they were both fully pore loaded and fully charged, and thereafter vacuumizing, and next, admitting nitrogen in amount adapted to develop a predetermined cell internal pressure, and thereafter discharging the battery, whereupon the extent of variations of cell pressure, is also largely reduced.

In an alternate approach that offers the advantage of increased flexibility stabilization of cell behavior at advantageous states of charge of positive and negative electrodes can be effected by merely venting a predetermined amount of gas when a cell incorporating electrodes that have never before been charged is given its first charge, and then vacuumizing the cell and filling with nitrogen, and determining the desirable amount of gas that should be vented by means of tests on a series of cells, followed by correlation of cell performance with the amount of gas vented.

Other techniques are possible.

What is required is to employ an effective technique of causing the states of charge of the positive and negative electrodes of the battery to assume values that are favorable to both discharge and recharge capability, and to then stabilize the cell by vacuumizing and thereafter admitting an inert gas.

While in the present disclosure the above concept has been described as useful when applied to cells having resealable pressure relief type vents, such as are employed in the case of aircraft type nickel-cadmium battery cells, presumably it would also prove to be useful if employed in the case of sealed commercial and space craft cells of nickel-cadmium type.

While proceeding as above will establish an initial favorable status of the states of charge of the battery's electrodes, the same technique can be used to reestablish such status, if, due to malfunction of the control system, or for any other reason, there is substantial discharge of gas through cell vents.

MODE OF OPERATION

Referring to FIG. 3, when, with the vehicle at rest, the vehicle's ignition key is inserted in ignition switch 18, and the switch is turned to the "run" position, but not so far as to initiate operation of the engine starter, both ignition system 21 and lead 63 will be energized, and if contact bridging member 130 of relay 60 already is in its latched-up position, or, via push button 61, is caused to move to that position, leads 64, 72, 79 and 111 and power source 108, and hence also digital controller 85, will be energized while also the contacts of contactor 106 will close and cell equalizer 70 will begin to function.

To conform with what has been earlier referred to as Ford B strategy type of hybrid drive, computer 85 will need to be programmed so that when motor speed is less than a first preset value, which we will refer to as motor speed control point #1, it will activate transistor switch 121, thereby causing cut off of fuel to the vehicle's engine.

Then, but, as will be later explained, only if the propulsion battery is sufficiently charged, and if its internal cell temperature exceeds a preset value, pressure applied to the vehicle's accelerator pedal will cause the resistance of resistor 28 to increase, and, as a result transistor 113 will begin to transmit pulses of current of pulse width determined by the extent of depression of the vehicle's accelerator pedal.

When it comes to motor field current, while various approaches to control are possible, and while which is selected is not necessarily important to the present invention, an approach that will be herein described is to cause field current during battery discharge to vary in magnitude in proportion to the magnitude of armature current, thereby giving the effect of a series motor.

To achieve this result digital controller 85 requires to be programmed to integrate the difference between its analog inputs 86 and 88, the arrangement being made such, via adjustment of operational amplifier gain controls, that the difference of these inputs is zero when the proportion between battery discharge current, which is nearly equal to motor armature current, and motor field current, is as desired.

With controller 85 so programmed the effect is to generate a voltage output signal dependent in sign on whether the integral is positive or negative, which signal is transmitted to transistor switch 51 causing it to pass or withhold passage of current, as needed, whereby to drive the value of the integral to a null, thereby causing motor field current to vary in proportion to battery discharge current, and hence substantially, in proportion to motor armature current, while with both armature and field current present, there will be a resultant torque, which, if sufficient, will cause the vehicle to accelerate.

With development of motor speed controller 85 input terminal 90 will receive a speed signal and, in conformity with the Ford B strategy, will be programmed to respond to attainment of a speed equal to motor speed control point #1 by deactivating transistor switch 121 at that speed, whereupon the engine will receive fuel.

Also, again as per strategy B at a preset moderate value of speed, which we will term motor speed control point #2, controller 85 should cause transistor switch 118 to energize relay 112, which will terminate battery discharge.

Now, as earlier noted it is an aspect of the the modified Ford B which is employed in the present invention strategy that the size of the battery would be determined primarily by its vehicle's requirements in the area of propulsion up to motor speed control point #2, and that, to this end, requirements as to charge acceptance via regenerative braking would be made less than enough to usually suffice to keep the battery at a desirable state of charge which implies a need to plan to normally employ what we will refer to as supplementary charging, in addition to charging via regeneration during braking.

In supplementary charging rate of charge needs to be sufficiently restricted as to not too greatly impose a load on the engine that would interfere with the vehicle operator's desired ability to accelerate the vehicle, while also supplementary charging needs to be caused to terminate in a manner that will be adapted to, insofar as feasible, cause the state of charge of the battery to adjust to a desirable preregenerative braking value.

When it comes to how to control regenerative braking, the writer's tests have shown that, in order to avoid internal evolution of gas at an undesirable rate, coupled with reduction in discharge-recharge energy efficiency and battery discharge capability,
(a) magnitude of charge current needs to be restricted,
(b) termination of the charge process needs to be effected in a manner that depends on the history of cell current flow during the braking process, and on the state of charge that prevails at the start of that process.

Battery size has to be chosen so as to, as far as possible, at all times provide for a predetermined minimum discharge capability, and hence, in the interest of reducing battery size, there is an advantage in providing for a high state of charge prior to initiation of regenerative braking, yet providing for too high a preregenerative braking state of charge will limit the amount of charge that can be received during braking before development of adverse effects associated with too rapid gas evolution, whether momentary in nature, or of a slow increase type, that, in due course, will cause significant discharge of gas to atmosphere, and therefore there is a need for a trade-off as between the pros and cons that apply.

While voltage of battery cells represents a parameter that varies with cell state of charge, its employment as a way to evaluate that quantity is complicated by the facts that,
1—at zero current, cell voltage at a given state of charge depends on,
 (a) cell internal temperature, and
 (b) the history of cell current flow,
2—the effect of cell current is to modify zero current cell voltage, but the proportionality factor between fast voltage change and fast modification of current flow, which we will here refer to as
 ACR=apparent cell resistance,
depends on
 (a) direction of current flow, ie, whether the battery is charging or discharging,
 (b) cell internal temperature, and,
 (c) the history of cell current flow,
and where hybrid drive is involved, the effects can be large, while also values of ACR also differ as between different cell designs, and methods of electrode manufacture, and it therefore applies that there is a need, in development of charge control systems for a propulsion battery that would represent a component of a hybrid drive system for a road vehicle, to provide to suitably take into account the influence of these several aspects of cell behavior.

When it comes to the effect of history of cell current flow the point applies that, though, after current flow is stopped, voltage changes rapidly, it also continues to change over a period of time, so that when reference is made to a particular value of zero current cell voltage, what is said has to be qualified in respect to at what point in time following development of a current zero is being referred to.

In discussing the problem of providing for desirable charge control, the writer will refer partly to tests that he has carried out on a particular low pore loaded type of small cell which incorporated 12 positive and 12 negative porous electrodes, each 0.025 inches thick and having one square inch of impregnated area, and for which extent of pore loading was as below,
 positive electrode 0.37 grams
 negative electrode 0.24 grams
and for which, also, in the case of one cell of this type, as of the date of file of this application, a total of 219,000 cycles of simulated hybrid drive discharge and recharge have been carried out, and partly to tests on a small nominally 4 ampere hour flooded type commercial cell having 7 positive and 8 negative electrodes that are 4 square inches in area.

In these tests the vents of the cells made connection to a U tube as well as a pressure transducer, and the the electrical output of the transducer was continuously recorded, as were also cell current and voltage and cell internal temperature as determined with a thermocouple.

A total of three small low pore loaded cells have been subject to test as of the date of file of the present patent application.

In cycling, the cycle initially employed was along the lines of that specified in the Ford Motor Request for Quotation, which called for two discharges, a main discharge for 3 seconds, and a supplementary discharge after 20 seconds, followed by a six second charge.

However, in the case of the second cell, after 7,000 cycles of discharge and recharge the concept of employing a supplementary discharge was given up, and charge acceptance during the 6 second charge period was somewhat reduced below charge delivery during 3 second discharge, with the resultant supplementary charge deficiency made up by initiating a supplementary charge, at a 3 ampere rate, 10 seconds after termination of discharge.

During the first 46,000 cycles of charge and discharge of this second cell, which will be identified as cell 113-x, current was adjusted to as high as 20 amperes, on both main charge and discharge, and it was also found possible to charge at 20 amperes and discharge at 35 amperes. Also, cell behavior at temperatures down to 10° C. were investigated.

However, though in these tests cell pressure typically levelled off at less than 12 inches of water, at both high discharge currents and low cell temperatures, energy available on deep discharge was undesirably low, and after reviewing what was involved, the bulk of all following tests on this cell and the third low pore loaded cell, which will be designated as cell 114-x, were carried out at 40° C. cell temperature, with charges and discharges about as below, main charge—current averaging 5¾ amperes over a 6 second period discharge—(starting 18 seconds after end of main charge) 13 amperes for 3 seconds supplementary charge—(starting 10 seconds after main discharge) 3 amperes with charge termination taking place at a preset value of cell voltage.

In tests of cell 113-x carried out, as above with supplementary charge termination voltage set at 1.32, at a point at which a total of 180,000 cycles of discharge and recharge had been experienced, it was noted that, if, after cycling continuously for 24 hours or more, a deep discharge to 0.6 volts was carried out with discharge current maintained at 13 amperes, the duration of discharge to the point at which cell voltage reached 0.8 was typically in the range of 45 to 60 seconds.

But, in contrast, when, after termination of such a discharge, normal cycling, with termination of supplementary charge taking place at 1.32 volts, was resumed, and, after one such cycle a second deep discharge was carried out, again with 13 amperes maintained, cell voltage would drop to 0.8 volts in only 5 seconds, while, if again, after 5 or 10 normal cycles, still another deep discharge to 0.8 volts was effected, there was little improvement.

The key factor here was perceived to be that after deep discharge to 0.6 volts apparent cell resistance, or ACR, went up considerably, with the effect that cell voltage would rise to 1.32 volts and in consequence charging would almost at once after supplementary charging began and in consequence charging would almost at once come to a halt.

A related point was that, whereas in normal cycling, after a supplementary charge terminated at 1.32 volts, cell voltage leveled off at 1.30, in contrast, on a deep discharge to 0.6 volts followed by fast termination of supplementary charge at 1.32 volts cell voltage dropped to 1.26, a zero current cell voltage that identifies with low discharge capability.

Thus the net effect was that, after every discharge, termination of supplementary charging took place so soon that cell recharge largely failed to take place even after 10 normal cycles of discharge and recharge. As cycling tests showed, for this cell, with supplementary charge current held at 3 amperes if, following a discharge at 13 amperes to 0.6 volts, supplementary charge termination voltage was raised to 1.40 volts, the effect was that, in cycling, the duration of supplementary charge was increased to 35 seconds per cycle for 3 cycles with charge terminations taking place at 1.36, 1.38 and 1.40 volts respectively, so that a total of 105 coulombs were entered into the cell, an amount that is equivalent to 25 seconds of discharge at 13 amperes.

However, at the beginning of the third 35 second cycle of supplementary charge, gas evolution began to rise rapidly.

Next, following reduction of charge termination voltage to 1.36, as cycling proceeded internal cell pressure held constant for 16 cycles and then began a slow increase.

At the end of 27 cycles it was decided to revert to a supplementary discharge termination voltage of 1.32 whereupon further rise in cell internal pressure ceased to take place, and following which, in a 13 ampere discharge initiated after three more cycles, cell voltage reached 0.8 in 21 seconds and 0.6 volts in 25 seconds.

Other tests revealed that only a little added deep discharge capability had been achieved by maintaining supplementary charge termination by supplementary charging voltage at 1.36 for 24 cycles.

What all tests demonstrated was that while there is more of a problem in getting charge back into a cell than there is in getting it out, it is feasible to provide to rapidly restore to a cell, a limited amount, as say ⅓d, of what came out in a deep discharge following a period of long cycling.

However, it was also clear that fast partial reestablishment of discharge capability by supplementary charging following a deeper than normal discharge could only be accomplished if control on the basis of termination of supplementary charging at 1.32 cell volts was temporarily discontinued.

There are, of course, all manner of variations in the propulsion requirements that a vehicle operating in traffic is required to meet.

Operation in very slow traffic, whether on city or country roads, will give occasion for numerous starts and stops, and in the case of hybrid drive, though the depletion of battery charge due to each would typically be small the cumulative effect can represent the equivalent of a sustained high power discharge down to a low battery state of charge.

Eventually, however, with use of hybrid drive, even if only as a result of reversion to non hybrid operation, motor speed will become such as to allow battery recharging to begin, an event which will bring with it a need to employ it to rapidly restore discharge capability, yet at the same time avoid an undesirable degree of gas evolution within the cells of the battery.

Since there can be no assurance that regenerative braking will come into effect promptly, as well as in amount and duration sufficient to restore discharge capability, to achieve desired results following a deeper than normal discharge it will be needed to provide that, when and as motor speed allows, and except when charging via regenerative braking intervenes, supplementary charging will continue until a desirably improved battery state of charge has been achieved, which, in turn, implies a need to provide a control signal that can serve as an indication of charge state following such a discharge.

What the writer's tests have shown is that a signal meeting this requirement can be had in the form of the quantity $$\Delta Vdo(t) = Vdo(t) - Vdo(t)n \quad (1)$$

where,
$Vdo(t)$ = the cell voltage that obtains when following termination of a partial discharge the cell has remained on open circuit for t seconds,
$Vdo(t)n$ = the value of $Vdo(t)$ that applies in the course of normal cycling when internal cell temperature is the same as that applying when $Vdo(t)$ is measured, and state of charge is normal.

When it comes to what value of (t) to select for control purposes, too low a value would present problems due to the rapid change of $Vdo(t)$ with time at low values of t, while too great a value would operate to undesirably slow up charge control because it would undesirably lengthen the duration of the period of battery open circuit that is required to obtain following termination of discharge.

In practice it appears that a desirable choice of t would lie somewhere in the range of 3 to 10 seconds.

In the writer's analyses of test results the value of t utilized in evaluation of $Vdo(t)$ has been 10 seconds and unless otherwise stated, in what will be said in what follows as to the nature of test results, where reference will be made to $Vdo(t)$, $Vdo(t)n$ or $\Delta Vdo(t)$, t will have been taken as 10 seconds.

When it comes to normality of cycling the timing that the writer has taken to be normal is a 75 second cycle incorporating a 6 second charge, followed in 18 seconds by a 3 second discharge with supplementary charging beginning 10 seconds after discharge, and with degree of normality of state of charge governed by the value of

| Vprb | = | the cell's preregenerative braking voltage |
| | = | the cell voltage just prior to initiation of regenerative braking | with normal state of charge corresponding to $$Vprb = Vprbn \quad (2)$$

where Vprbn is so chosen as to result in adequate discharge capability, yet avoid sustained build-up of cell internal pressure, and, which, if there proved to be sufficient need to do so, would be made to depend on cell internal temperature.

Coming now to charge control, as the writer's single cell tests of discharge-recharge simulations of normal traffic conditions have shown, in normal traffic it will suffice to provide to terminate supplementary charging when average supplementary charge voltage per series connected cell Vsc attains a value.

$$Vsctn = Vcn + ACRsctn\, Isct \quad (3)$$

where
$Vcn$ = a control system reference voltage which approximates Vprbn
$ACRsctn$ = a control system parameter that approximates apparent cell resistance, ACR, at supplementary charge termination, under normal cycling conditions
$Isct$ = supplementary charge current at charge termination When it comes to simulated vehicle operation in which other than uniform cycles of discharge followed by recharge are to be controlled, the writer's test results have shown that cell 114-x which is the same as cell 113-x except for greater electrode plate pore loading and the fact that at the time of testing it had only experienced 30,000 cycles of normal cycling discharge-recharge, and also the small commercial cell that has been previously referred to, which will be designated as cell E1, behave generally in the same way as cell 113-x, though with different values of apparent cell resistance.

Also they have shown that, as in the case of 113x, it is possible to restore state of charge to normal, at a favorable rate, after it has been reduced to a lower than normal post discharge value and achieve this result without causing an objectionable degree of gas evolution within the cells if provision is made to continue supplementary charging for a suitably controlled time period beyond the point at which it would have been terminated with charging controlled via response to equation (3).

When it comes to when to terminate such additional supplementary charging, test results carried out in simulated cycles of hybrid drive indicated that an effective control technique is to provide to cause supplementary charging to terminate when cell voltage reaches a value,
where, $$Vsct = Vsctn + \Delta Vsct \quad (4)$$

$$\Delta Vsct = f1[Vdo(t)min - Vdo(t)c] \quad (5)$$

$Vdo(t)min$ = the lowest value of $Vdo(t)$ that the battery experiences in the interval between termination of discharge and termination of supplementary charging
$Vdo(t)c$ = a control system reference voltage that approximates to $Vdo(t)n$
and $f1[Vdo(t)min - Vdo(t)c]$ comprises an empirically determinable function of $Vdo(t)min$ which requires to be stored in the control system's memory, the value of which depends on the type of cell, and probably will be found to vary, also, with the number of discharge-recharge cycles that the cell has experienced, and possibly other aspects of service use.

Based on the above, controller 85 requires to be so programed that, when a deeper than normal discharge is followed by others that are less deep, and that occur before termination of supplementary charging takes place, termination of supplementary charging will be determined by equations (4) and (5) in which the value of $Vdo(t)min$ will comprise the value of $Vdo(t)$ that applied in the case of the first discharge.

However, if, subsequent to the first discharge, a still deeper discharge is experienced before termination of supplementary charging takes place, the value of $Vdo(t)$ that results from this deeper discharge will become the value of $Vdo(t)min$, and so on, in case the discharge in question is followed by a yet deeper discharge.

In the foregoing, taking into account the influence of cell internal temperature on the control system parameters $Vcn$, $Vdo(t)n$ and $ACRsctn$, can be viewed as an optional rather than essential requirement.

When it comes to deeper than normal discharges, there is a degree of depth below which the additional vehicle propulsion energy gained by allowing further discharge is small, while at the same time the chance of damage to some of the battery's cells as a consequence of cell reversal increases, and, also, as the writer's tests have shown, the increase in cell apparent resistance, ACR, that takes place as depth of discharge increases, tends to reduce the effectiveness of employment of equations (4) and (5), as rules for rapidly restoring discharge capability without generation of an undue amount of gas within the battery's cells.

Therefore, on all these three counts it is important to provide to terminate discharge and revert to non-hybrid drive when the state of charge of the battery's cells on deep discharge falls below a predetermined lower limit.

When it comes to evaluating state of charge during deep discharge, it is not feasible to employ $\Delta Vdo(t)$ as an index of charge state because it is necessary to arrive at an evaluation in advance of termination of discharge.

However, as tests show, it is possible to arrive at an indication of state of charge during a deep discharge that is adequate for the control action that is needed through use of the quantity, $$ACCRdd = (Vddr - Vdd/Idd) \quad (6)$$
= a deep discharge value of ACR which for a given size and type of cell is found to hold roughly constant, regardless of the value of Idd, provided that Vddr is properly chosen where, in the above
$Vdd$ = cell voltage on deep discharge
$Idd$ = cell current on deep discharge
$Vddr$ = an empirically determinable deep discharge reference voltage which depends on type and size of cell As a next step desirable control values of $ACRdd$ and $Vddr$, $ACRddc$ and $Vddc$ can be arrived at, after which controller 85 would be programed to cause discharge termination and reversion to non-hybrid drive to take place when $$(Vddc - Vdd)/Idd = ACRddc \quad (7)$$

wherein, if experience shows that there is sufficient need to do so, $Vddc$ and $ACRddc$ would be made to depend on cell internal temperature.

In addition it requires to be called for that controller 85 will be programmed to, at the same time, cause transistor 124 to pass current with the effect that operator information panel 58 would illuminate and inform the operator of the vehicle that it has temporarily reverted to conventional drive. Also it would be called for to take account of how $ACRddc$ varies in dependence on cell internal temperature with use of information that would be arrived at via tests carried out at different temperatures, while there would also be a need to provide to allow alteration of those parameters as a function of battery age under conditions of use.

When it comes to controlling the magnitude of supplementary charge current, in the simplest approach, its magnitude would be held constant, which would imply that for so long as motor speed equals or exceeds speed control point #2 controller 85 would require to be so programmed that, $$Isc = Iscd \quad (8)$$

where $Iscd$ is the desired constant value of $Isc$, which it would do by integrating the difference between $Isc$ and $Iscd$, and causing transistor 51 to pass current when the integral is negative and withhold current flow when it is positive, so as to drive it to a null.

But since there would be advantages from the standpoint of putting less load on the engine during periods of acceleration, and also in the way of improvement in charge efficiency, in providing to so program controller 85 that $Isd$ would be held low when cell state of charge was already high, and so that its value would increase when state of charge, and hence discharge capability, was low, whereby to speed up restoration of the latter quantity, it could be desirable that controller 85 would be so programed that rather than being held constant the value of $Iscd$ would be caused to depend on the magnitude of the quantity $\Delta Vdo(t)$, in a manner that would cause it to decrease as that quantity increases.

Also there, desirably, would be an election to so program controller 85 that if the value of $Vdo(t)$ were sufficiently high, initiation of supplementary charging would fail to take place, while, optionally the battery's high state of charge would be reduced either by use of battery current to drive the vehicle's motor or by transferring energy to the vehicle's auxiliary battery, or to the loads of that battery, via a d.c. to d.c. converter.

Moreover it could, and probably would, also be desirable to provide so that $Isc$ would be held low or zero when, and for so long as, the vehicle's accelerator pedal was fully or nearly fully depressed, a control feature which could be taken care of by adding to FIG. 1 a switch which would respond to accelerator pedal position and would be arranged to connect to power control unit 5 so as to provide an input to controller 85, which with the benefit of programming, would accomplish the result desired.

In addition to the foregoing it could be useful to so control engine implemented battery charging subsequent to reversion from hybrid to conventional drive taking place as a result of a deep discharge that was terminated per equation (7), that, if the vehicle's transmission 3 was other than in either a neutral position or low gear, charging would take place at the same rate as supplementary charge in hybrid drive, and so that if it was in neutral, or low gear position, if motor speed were sufficient, engine implemented charging would take place at a higher rate, which could be provided for if it were arranged that a signal input would be received by digital controller 85 that would indicate when transmission 3 was in neutral or low gear, and also so that, when this applied, and when also motor speed equalled or exceeded speed control point #2, controller 85 would so control transistor 51 as to increase the value of charge current in a predetermined manner.

At the same time, with the benefit of a visual signal from operator information panel 124, the vehicle operator would be informed as to the status of the drive system and could elect to depress the accelerator pedal enough to cause motor speed to exceed speed control point #2 as a way to ensure restoration of battery discharge capability, which would be followed by reversion to hybrid drive.

In this connection the point applies that when, at 40° C., the previously referred to cell 113-x that the writer extensively tested was discharged to 0.8 volts at 13 amperes, trials showed that it could be recharged at 12 amperes without undesirable gassing if charging was terminated at a cell voltage of 1.40, which indicates that when the vehicle's transmission is in neutral or low, or, at any rate, not in high gear, rapid termination of reversion from hybrid to conventional drive can be achieved by providing that controller 85 would be so programmed that rate of engine implemented charge would be increased well beyond values that would otherwise be employed, which, when provided for, would call for a change in the value of Vcn (in equation 3).

When it comes to charge control during regenerative braking, what is necessary is that controller 85 be programmed to cause passage of current by transistor 51 in such manner that, for so long as motor speed is sufficient, the magnitude of charge current and hence, braking effect, will increase as the vehicle's brake pedal is depressed.

For a linear relationship between motor braking torque and braking signal voltage output of potentiometer 32, which will be designated as BSV, it would be necessary that $$f2(If)Ib = (k1)BSV \tag{9}$$

where
- Ib = motor armature current taken positive when in a direction that will charge the battery,
- If = motor field current and f2(If) is a function that takes account of the non linearity of flux density along the air gap of the motor as a function of field current and (k1) is a constant.

Therefore, for most satisfactory results, it could be called for that controller 85 would be programmed to satisfy an equation of this type, insofar as motor speed permits, though in this area various options would be available.

However, in order to protect the battery, an overriding requirement is that regenerative braking charge current Ib will not exceed a maximum value Ibm, ie., as an equation, what is required is that $$Ib \leq Ibm \tag{10}$$

where
- Ibm = an estimated safe allowable upper limit of current during regenerative braking, and hence, controller 85 will require to be programmed to achieve this result.

When it comes to control of duration of regenerative braking, the objective is to so restrict duration that excessive gas evolution within the battery's cells will be avoided, which implies a need to terminate in response to an index of cell state of charge during the braking process.

When, as in normal traffic, in the use of the Ford B type of hybrid drive, regenerative braking typically only takes place over ½ minute after termination of battery discharge during the first stages of vehicle acceleration, the index of normality of charge state can be conveniently taken as the normal cycling preregenerative braking cell voltage, Vprbn, and in this type of traffic, if on level ground, supplementary charging would cause preregenerative braking voltage Vprb to equal Vprbn.

However, if a hybrid vehicle were on a down grade, while some driving power could be required following regenerative braking, as a way to gain speed, the amount required could be small, in which case Vprb would exceed Vprbn.

Now tests show that, under the above conditions, there tends to be a linear relationship between the quantity Vprb−Vprbn and the amount of available charge contained in a battery cell over and above the charge content that obtains when Vprb=Vprbn.

Hence, if,

| | | | |
|---|---|---|---|
| Qb | = | ∫ Idt | (11) |
| | = | the charge received by a cell during regenerative braking | |
| Qbn | = | the normal cycling value of Qb, | | if Vprb exceeds Vprbn, in order to end up with no more than a normal cycling charge state it will be required that regenerative braking terminate when $$Qb = Qbn - k2\Delta Vprb \tag{12}$$

where $$\Delta Vprb = Vprb - Vprbn \tag{13}$$

and

K2 = an empirically determinable quantity

On the other hand conditions will be different if regenerative braking comes into effect following a deeper than normal discharge.

Thus, though it might be expected that equation (12) would still apply, in fact it does not, due in part to the fact that braking can begin when supplementary charging is already in effect, and in part to the greater problem of getting charge into cells against getting it out, and the related fact that following a deep discharge the cell can be too little charged even when ΔVprb is positive.

Instead, based on the results of laboratory testing, when regenerative braking comes into effect following a deeper than normal discharge, and before the battery's charge control system has terminated supplementary charging, unless regenerative braking is first terminated as a result of operator control action, or lack of vehicle speed, termination should be arranged to take place when $$Qb = Qbn + k3(Vsct - Vprb) \tag{14}$$

where Vsct is given by equation (4) and k3 comprises an empirically determinable quantity.

The foregoing, however, does not take account of the fact that regenerative braking can come into effect almost at once following a period of battery discharge, and hence under conditions in which Vdo(t) is not known, with the effect that equation (4) is also not available.

Now tests show that failure to control, as per equations (12) and (14), when only taking place infrequently, does not operate to cause consequential gassing, which being the case it does not appear likely that, when state of charge is high, there would be a need to do more, in the fast application of regenerative braking case, than program controller 85 to terminate regenerative braking when $$Qb = Qbn \quad (15)$$

and this could also suffice whether or not state of charge is high.

However, it could yet be in order, in the case of high current deeper than normal discharges in which regenerative braking comes into effect before Vdo(t) is known, to provide to use equation (14) with Vsct computed from equation (4) except that because Vdo(t) type data are not available in equation (4), ΔVsct should be taken from equation (16) below, rather than from equation (5)

$$\Delta Vsct = f3[ACRjbdt] \quad (16)$$

where $$ACRjbdt = (Vprbc - Vjbdt/Ijbdt \quad (17)$$

Vjbdt and Ijbdt represent battery voltage per series connected cell, and cell current respectively, just prior to termination of discharge, f3[ACRjbdt[ represents an empirically determinable function which requires to be stored in the control system's memory, and Vprbc represents a control system reference voltage that approximates to Vprbn.

Also, optionally, it could prove to be useful to employ equation (16), either in place of or in combination with equation (5), as a basis for employment of equation (4) for purposes of control of supplementary charge termination.

Hence, unless refinement of the charge control process is wanted it would be called for that controller 85 would be so programmed that, if not first terminated by operator control, regenerative braking would be caused to terminate in response to equations (12), (13), (14) and (15) with Vsct in (14) determined by equations (4) or (16) and (17) depending on the nature of operating conditions.

While programming controller 85 as above would serve to avoid undesirably rapid gas evolution as a consequence of too long a duration of regenerative braking, and would also operate to increase the charge that could be accepted if state of charge at the start of braking were low, it fails to take account of the fact that the amount of charge that a storage battery can accept without development of undesirably rapid internal evolution of gas increases as rate of charge decreases.

Hence, it must be accepted that, as a refinement, equation (13) could be modified with this in mind.

In one approach this could be done by substituting Xb and Xbn for Qb and Qbn in equations (12) and (14) above $$Xb = (Ib)^n dt \quad (18)$$

Xbn = planned for normal value of Xb and
n is a number greater than 1

To examine what this would achieve we may take note of the fact that for the particular case of constant current, it would follow from equations (11) and (15) that $$Xb = (Ib)^n t \quad (19)$$
$$= (Ib)^{n-1} Qb \quad (20)$$

and hence,

-continued
$$Qb = Xb (Ib)^{1-n} \quad (21)$$

which would imply that in the constant current case, for a fixed value of Xb, Qb, the charge accepted by the battery during regenerative braking would, in the constant current case, be proportional to $(Ib)^{1-n}$ and hence since n is greater than unity, would increase as current magnitude dropped.

The above shows only one of various possible ways to modify equations (12) and (14) so that the maximum amount of charge that would be accepted during regenerative braking would be caused to increase as rate of charge decreased.

Whether so modifying these equations would be worth doing, would best be determined after a hybrid drive vehicle is built.

In a first approach terminating regenerative charge could be carried out by withholding flow of current through transistor 51 when equations (12) and (14), or a modified version of these equations based on equation (16) are fulfilled, after which flow of current in motor field 46 would begin to decay exponentially, and in a matter of perhaps a second or a portion of a second regenerative charging and braking would cease, despite operator pressure on the brake pedal.

However, in another approach, it could be provided, via suitable programming of controller 85, so that, so long as sufficient deflection of the brake pedal was in effect, by suitably controlling transistor 51 there would be a pulsed flow of current through it that would be so regulated as to cause continued flow of charge current into the battery and continued regenerative braking action in a preprogrammed manner that would avoid excessive gas evolution, with the rate of charge tapering off to nothing in a controlled time period.

Because, in what appears to represent a characteristic feature of a nickel-cadmium cell, the writer's test have shown that, if a cell stands for some hours, or even one hour without being subject either to charge or discharge it can be necessary to at first charge it at a low rate, even after it has just been subject to discharge, as could apply when a vehicle that has been standing for an hour or some hours, is started, and, when it first gains speed, begins to be charged, since otherwise cell voltage may rise to as high as 1.70 to 1.80 volts and there may be an associated undesirable rate of gas evolution.

In such case, speaking in terms of the writer's small cells it can be desirable, rather than charge at either 3 or 6 amperes, to charge at 1 ampere, at least until the next discharge, which implies the desirability of programming controller 85 so that the history of battery current flow is memorized and taken into account in programs of charge control during both regenerative braking and engine implemented battery charging.

When it comes to the nature of the function f1[ΔVdo(t)min] the writer's tests of cells 114-x and E-1 have yielded the data shown in Table I below,

TABLE I

| ΔVdo(t)min | $\Delta Vsct = f1[\Delta Vdo(t)min]$ millivolts | |
|---|---|---|
| (millivolts) | cell 114-x | cell E-1 |
| 0 | 0 | 0 |
| 5 | 8 | 11 |
| 10 | 15 | 21 |
| 15 | 20 | 28 |
| 20 | 24 | 30 |

TABLE I-continued

| ΔVdo(t)min (millivolts) | ΔVsct = fl[ΔVdo(t)min] millivolts | |
| --- | --- | --- |
| | cell 114-x | cell E-1 |
| 30 | 29 | 30 |
| 40 or more | 32 | 30 |

When it comes to values of ACRscn test results are as shown in Table II,

TABLE II

| | ACRscn = (Vsctn-Vprbn)/Iscn | | | |
| --- | --- | --- | --- | --- |
| | cell 114-x | | cell E-1 | |
| | 40° C. | 30° C. | 40° C. | 30° C. |
| Vsctn-Vprbn(millivolts) | 18 | 30 | 30 | 42 |
| Iscn (amperes) | 3 | 3 | 6 | 6 |
| ACRscn (ohms) | .06 | .10 | .05 | .07 |

In addition controller 85 needs to be so programmed that it will terminate hybrid drive operation and simultaneously cause sustained reversion to conventional drive when the magnitude of the signal that it receives at terminal 80 from cell equalizer 70, over dual lead 75, indicates that the problem of equalization of the cells of propulsion battery 85 has become excessive, as evidenced by too high a voltage across shunt 82 shown in FIG. 2, and to this end the controller needs to be programmed to deactivate transistor 121 and activate transistor switch 127 when this type of signal is received, whereupon fuel will be admitted to the engine regardless of motor speed, and also latch release coil 130 of relay 60 will be energized causing that relay to deenergize lead 64 and energize lead 66 whereupon operator instruction panel 165 will illuminate and inform the operator of the vehicle that there has been a sustained reversion from hybrid to conventional drive, and thereby indicate a need to use the vehicle's starter if the engine stops, and to also have resort to the services of a trouble shooter in order to allow restoration of hybrid drive capability.

Because ACR increases and hence discharge-recharge efficiency drops as cell temperature decreases, it is desirable to normally hold cell internal temperature higher than ordinary room temperature, yet not so high as to damage the electrodes, while also, for a nickel cadmium battery, it appears that desirable normal temperature is in the range 40° to 45° C., a figure which, fortunately, is not inconsistent with use of ambient air for cooling purposes.

Hence there is a need to so program controller 85, which receives temperature signals over leads 15 and 16, and generates output signals which are transmitted, over leads 26A, 26B, and 26C, to battery temperature controller 9, that, if the internal temperature of the cells of the battery is below whatever temperature range is settled on as desirable it will cause circulation of heated air through the battery, and, if it is above that range so that it will cause circulation of air that is cooler than the battery, which, in summer, could comprise ambient air, but in cold winter weather perhaps would best comprise ambient air the temperature of which had been somewhat increased, but not increased enough to prevent it from acting effectively as a means of preventing an undesirable increase in battery cell internal temperature.

Also, because, when battery cell internal temperature goes low the problem of providing desirable charge control is increased, and, more particularly, because, based on the writer's tests of a low pore loaded cell designated as 112-x, it has seemed likely that cell damage can take place if hybrid operation is so carried out without considerably reducing rate and amount of charge acceptance per pound of battery weight, it has appeared to be the course of wisdom to provide to entirely terminate battery charging when cell internal temperature is less than 30° C., or optionally 25° C.

Hence, on this basis, controller 85 needs to be so programmed as to cause flow of current through transistor switch 118, in such case, which, when taking place will cause closure of the contacts of relay 112, thereby preventing flow of propulsion battery current in a discharge direction, while at the same time, the controller should activate transistor switch 124 which will cause operator instruction panel #1 to illuminate, and also hold transistor 121 deactivated, whereby to allow access of fuel to the vehicle's engine.

Panel #1, when illuminated, will advise the operator that hybrid drive is temporarily not in use, which implies that, in case the engine is not running, he needs to rotate the vehicle's ignition switch sufficiently so that its starting motor will start the engine.

Because the vehicle's battery temperature control system will have been, or will come into, effect, battery cell internal temperature will shortly begin to rise, and after the necessary lapse of time will attain the level of 30° or 25° C. at which hybrid drive operation including battery charging can be safely carried out, whereupon, if cell voltage exceeds a memorized minimum control value, by virtue of its programming controller 85 will deactivate transistor switch 118 and 124 and reactivate switch 12, with the effect that both operator instruction panel #1 will cease to illuminate, and the vehicle will be restored to hybrid drive, while if cell voltage falls below the memorized minimum control value restoration to hybrid drive will be delayed until battery voltage per series connected cell has increased enough as a result of engine implemented charging that charge termination has taken place.

As previously noted it is important to provide to periodically recondition nickel-cadmium batteries. In the case of aircraft batteries, in reconditioning it is practice to first discharge the battery as a whole to say 0.8 volts and then short out individual cells for a period of some hours, after which recharging is carried out at a low rate.

Reference 10 treats of the reconditioning of space cells and the advantages that can be derived with use of the type of cell equalizer therein described to which cell equalizer 70 shown in FIGS. 1, 2 and 3 closely conforms.

Per reference 10 with use of low forward voltage drop diodes and short leads it is possible to discharge space cells at the 1 hour rate to about ¼ volt per cell and from the writer's test results it has appeared that in the case of only partly charged cells that would be used in hybrid-drive service, holding at ¼ volt for as little as 15 minutes could serve largely to discharge the cells and thereby cause them to be desirably reconditioned, when, subsequently, they are recharged to a charge state in which open circuit cell volts at 40° C. equals or reaches 1.28.

However, where, as in a battery that has seen long service, problems of cell variation will inevitably arise, with availability of a cell equalizer it might prove to be desirable to discharge once in every 24 hours for as much as 1 or more hours, when this much time is available.

In the case of personal use vehicles slow discharge could usually easily enough be carried out during night time hours, while even in the case of a taxi, as the writer understands, there is usually at least a 2 hour period, once every 24 hours when it is not in use.

In one way reconditioning could be effected by providing to plug into the vehicle a unit incorporating resistors, and perhaps a fan to keep them cool, that would cause desired discharge.

In one approach, it could be provided so that after discharge the slow recharge needed to adequately recharge the battery would be automatically carried out when next the vehicle is operated, with use of engine implemented charging during operation with conventional drive, while in another approach, where power was available from city mains such power could be used to effect the recharging process.

To prevent excess rate of gas evolution in the recharging process, based on the writer's experience, it would be important for controller 85 to be so programmed that the vehicle would be started by the starter, and hybrid drive only begun after a preprogrammed period of cell charge at a value of current not exceeding 1/5th of the limit of charge current that would apply during regenerative braking in hybrid drive operation.

Though at a stage in the investigations that led to the findings on which the present patent application is based, attention became primarily focused on protecting a nickel-cadmium battery that would be used as a component of an engine-electric motor-battery hybrid drive system for a road vehicle, where the drive strategy would be of the Ford B type in which the engine is of full or nearly full size, earlier on work was also done on the Ford A strategy, which uses an engine of reduced size.

The Ford B strategy was primarily studied because it allows use of a smaller battery than does the Ford A, and therefore represents less of a problem to implement than the latter.

However, there could yet be a place for an engine-electric type of hybrid drive system for a vehicle that uses an engine of substantially less than full size, and, in particular, this could be true if success is attained in the U.S. government sponsored development by the Ford Motor Co. of the Stirling engine which is of the external combustion type, and would be expensive to build in large sizes.

Again, it has been well recognized, that, in the event of successful development of high energy density batteries that would not be adapted to either fast charge or discharge, there will be a need for supplementary use of what has been termed a power battery with the capability of providing energy at a high rate for purposes of accelerating the vehicle, and to allow accepting charge at a high rate during regenerative braking, which implies that the concepts as to how to favorably control fast charging that are disclosed in the present application are directly applicable to the dual battery hybrid drive case.

In the dual battery vehicle case, supplementary charging of the fast discharge-recharge power battery would be effected by drawing power from the high energy density battery, not only before initiation of regenerative braking, but, when needed, also after it had terminated and vehicle speed was low, as well as when the vehicle was stationary, since supplementary charging could be carried out independently of motor speed.

In both the Ford B engine-electric, and dual battery cases, the charge control objectives applying to the fast discharge-recharge battery would remain the same as in the Ford A engine-electric case, namely to provide for long discharge-recharge cycle like, despite use of a small battery.

With use of the Ford A engine-electric strategy, and also in the dual battery all-electric case, the fast discharge-recharge type battery is large enough to help out on hills and to provide accelerating power to allow passing other cars at high speed.

However, this difference in service use from the Ford B strategy case would not appear to call for changes in method of charge control.

Also, cycling tests of a motorcycle size lead-acid battery that began only two months before the date of the present application have indicated that, though the usual type of lead-acid battery behaves differently from the nickel-cadmium type in that gas once evolved has little or no tendency to redissolve in the electrolyte and react with the electrodes, which implies inability to prevent discharge of internally generated gas to atmosphere, and while, for the cell tested, gas evolution typically takes place on discharge as well as charge, the point yet applies that employment of suitably restricted acceptance of charge during regenerative braking, can serve a useful purpose by holding rate of gas evolution low, and in this way can not only reduce need to periodically add water to cells, but would, at the same time, improve discharge-recharge efficiency, and could also be expected to favorably affect battery discharge-recharge cycle life.

Further, what applies to the lead-acid type of battery can be expected to apply in the case of other high power acceptance and delivery secondary batteries such as nickel zinc and nickel iron types, while also it could work out that in the case of batteries of these two types elimination of discharge of gas through pressure relief type cell vents would prove feasible.

Hence it is to be understood that the utility of the new charge control concepts disclosed in the present invention is not restricted to use of batteries of nickel cadmium type.

Whereas, in what has gone before, it has been called for that rate of charge of nickel-cadmium batteries would be held low enough to avoid discharge of gas generated within battery cells to escape through pressure relief type vents, it could be that in some applications this objective would undesirably restrict ability to accept charge, in which case controller 85 could be programmed to merely so control charging as to hold low the rate of discharge to atmosphere.

When it comes to type of motor, whereas a separately excited d.c. motor has been shown in the preferred embodiment, it is recognized that with the benefit of solid state circuitry other types of motors are capable of use, and that it would be possible to employ a separate a.c. generator to provide rectified current for battery charging.

When it comes to type of controller, use of digital control has been described in place of controls of analogue type only because as of today doing so saves complexity and expense and substitution of analogue type controls in whole or in part would not alter the inventive concepts that have been disclosed.

Whereas in the present disclosure, the fast discharge-recharge battery has been treated as a group of series connected cells, it is to be understood that it could comprise two or more groups of cells connected in parallel, while also as per reference (14) it is possible to change from parallel to series connection as an aspect of the vehicle's control system, which can also include starting resistors.

Also there might be an election to provide for automatic control of the vehicle's transmission unit 3, one advantage being increased capability to easily design to give effect to regenerative braking.

These and other changes could prove to have utility and, therefore, while what has been described sets forth what is considered to comprise a preferred embodiment, together with certain alternate forms of the invention, other modifications will occur to those skilled in the art, and it is intended to cover in the appended claims all such modifications as fall within the true spirit and scope of the invention.

TABLE OF REFERENCES (1) S. A. Loukomsky, U.S. Pat. Nos. 3,540,930 and 3,540,931 issued November 17, 1970, assigned to Battery Development Corp., New York, N.Y.

(2) Bernard Agruss (Electrochemistry Department, General Motors), "Testing Batteries for Vehicular Applications", Journal of the Electrochemical Society, February 1971, pp. 375-381

(3) Final Report—Hybrid Heat Engine/Electric Systems Study, Aerospace Corporation Report No. TOR-0059(6769-01)-2, Vol. 1, June 1, 1971

(4) L. E. Unnewehr, J. E. Auiler, L. R. Foote, D. F. Moyer and H. L. Stadler, "Hybrid Vehicle for Fuel Economy", SAE paper 760121, February 1976

(5) L. E. Unnewehr, R. L. Bailey, H. L. Stadler, A. H. Turner "Energy Saving Potential of Engine-Electric Vehicular Drives" 11th Intersociety Conference on Energy Conversion, Lake Tahoe, Nev., Sept. 13, 1976

(6) Ford Motor Co. Request for Quotation PIR-482332, June 24, 1976

(7) Telephone conversation with L. E. Unnewehr, May 6, 1976

(8) *Gould Battery Handbook,* 1973, p. 346, Gould, Inc. 1110 Highway 110, Mendota Heights, Minn.

(9) *SAFT Storage Battery Division,* Catalog DCM 3 4-74 3174 2 entitled "Sealed Rechargeable Nickel-Cadmium Cells VR Series", SAFT Societe des Accumulateurs Fixes et de Traction, 156, Avenue de Metz, 93230 Romainville, France, and SAFT America, New York, N.Y.

(10) NASA Technical Note TND—8508, June 1977

(11) Floyd E. Ford and Thomas J. Hennigan, "Nickel-Cadmium Batteries for the Orbiting Astronomical Observatory Spacecraft-11 (OAO)", 24th Power Sources Symposium proceedings, May 19-21, 1970, pp 1-4

(12) John D. Armantrout, Ford Aerospace and Communications Corp., Palo Alto, Calif., "SMS/GOES Cell and Battery Data Analysis'-'—Final Report, Dec. 1977, prepared for NASA, Goddard Space Flight Center, Greenbelt, Md. 20771

(13) V. Wouk, "Control Apparatus for Electric Automotive Vehicles" U.S. Pat. No. 3,546,548, Dec. 8, 1970

(14) Olaf G. W. Fersen, Automotive Industries "Bosch Investigates Hybrids", Apr. 15, 1974, pp 43-45

(15) Dan Armstrong and Michael Pocobello, "A Quiet, Efficient Controller for Electric Vehicles", SAE Paper 750470, February 1975

(16) Francis T. Thompson, "Advanced Electronic Control Systems for Electric Vehicles", Proceedings International Conference on Automotive Electronics and Electric Vehicles, Sept. 20-22, 1976, pp 22-1-9

(17) Application Data Sheet 803/7, Copper Development Association, Inc., New York, N.Y. 10017 (made available as of Oct. 24, 1977)

(18) See for example the linear motion transducer literature of New England Instrument Co., Kendall Lane, Natick, Mass. 01760

(19) See for example bulletins available from Power Functions Engineering Inc., P.O. Box 2312, Garland, Tex. 75401

(20) See for example catalog of Lambda Electronics, 515 Hollow Road, Melville, Long Island, N.Y. 11746

(21) Automatic Electric Co., Northlake, Ill., Class B relays series BRM magnetic latching, bulletin C-1993-A, 40M-4-68-M

(22) National Aeronautics and Space Administration—Lewis Research Center, Cleveland, Ohio. "State-of-the-Art Assessment of Electric and Hybrid Vehicles" January 1978 National Technical Information Service Document HCP/M1011-01 UC-96

CLAIM TERMINOLOGY

A storage or secondary type battery comprises a group of cells which, typically, are all connected in series, though a battery can also consist of two or more parallel connected group of series connected cells.

A cell consists of groups of parallel connected positive electrodes interleaved with groups of negative electrodes, but separated from them by separators.

In the types of hybrid drive systems for road vehicles with which the present invention disclosure is concerned, while use of a lead-acid auxiliary battery is contemplated, or of there will also be provided what in the claims is referred to as a fast discharge-recharge battery which is used to power the vehicle's motor during periods of acceleration, and that is adapted to be rapidly partly recharged.

In the terminology of the claims, the word battery, when not qualified, has reference to the fast discharge-recharge battery.

In the claims reference is made to battery and electrode states of charge, and to safe upper limit of battery charge acceptance.

When the positive and negative electrodes of a storage battery are fully discharged the nature of their active components will be characteristic of that state, and by way of example, for a nickel-cadmium battery, in the case of the positive electrodes the active material takes the form of particles of nickelous hydroxide, while for the negative electrodes it comprises particles of cadmium hydroxide.

Charging alters the nature of the active materials.

In particular, in the case of nickel-cadmium batteries at the positive electrode it converts nickelous hydroxide to nickelic hydroxide, while at the negative electrode it converts cadmium hydroxide to cadmium.

When a nickel cadmium battery is charged for a sufficiently long period of time, conversion of the active materials to nickelic hydroxide and cadmium will be almost complete, but in the case of hybrid drive the electrodes of the fast discharge-recharge battery are only partly, and, typically, not half, charged, because fast charging to a more charged condition would damage the electrodes due to rapid evolution of oxygen at the positive electrodes and hydrogen at the negative electrodes.

Thus, in service use in a hybrid vehicle the positive and negative electrodes of the vehicle's fast discharge-recharge battery are characterized by their individual states of charge, that are always partial and, also, that can easily become unequal.

By battery fast discharge capability, is meant ability to deliver energy on discharge at a useful voltage, a capability that will terminate when either the positive or negative electrodes of a battery approach sufficiently to a state of full discharge.

Ability to safely tolerate charging at a useful rate will terminate when either type of electrode is already at a charge state at which further charging would cause cell damage.

Hence to attain favorable results, it is necessary to provide to avoid a condition in which the positive electrodes are well charged, while, at the same time, the negative electrodes are little charged, and vice versa.

The active materials of the electrodes take the form of particles which can vary in size and crystal form, while the behavior of the electrodes, and of the battery on either discharge or charge can depend markedly on these aspects of battery condition.

While the term battery state of charge is commonly used to characterize the number of coulombs that a battery can be expected to deliver when discharged in a specified manner, in the claims, it is used in the sense that relates both to (a) the ability of a battery to rapidly deliver energy before voltage drops excessively, and, (b) its ability to receive charge without adverse effects taking the form of cell damage associated with rapid evolution of gas.

In the terminology of the claims, if state of charge is on the high side, the battery will deliver a large number of ampere minutes of charge before voltage drops excessively, but will be limited in ability to rapidly accept charge without undesirably rapid gas evolution.

In contrast, if state of charge is on the low side, the reverse will be true.

What is desirable is that in normal vehicle operation the state of charge of the battery will be intermediate between high and low.

For satisfactory charge control there is thus a need for ways of evaluating state of charge considered in the above sense.

While there appears to be no feasible way to predict storage battery behavior precisely, it is an important aspect of the present invention that more than one way is described of providing an index or what is termed, in the claims, "an indication" of battery state of charge.

What is claimed is that the "indications of state of charge" that are described can be usefully employed both to maintain favorable discharge capability and to avoid problems that can arise in the course of processes of charge.

In use of a hybrid drive vehicle there is sometimes a need to supply battery power for an unusually long period of time before recharging takes place.

With battery size determined with this in mind, under average traffic conditions a discharge that makes use of only a small fraction of the battery's discharge capability will suffice to adequately accelerate the vehicle, while regenerative braking will usually suffice to supply much of the power needed for battery recharge.

The claims make reference to "normal cycling" and "when state of charge is normal".

What the term normal cycling is intended to refer to is discharging and recharging under a prescribed set of conditions that are viewed as typical of average traffic.

By "when state of charge is normal" is meant that values of battery state of charge throughout cycles of discharge and recharge are such as to make for as high, or nearly as high, a battery discharge capability as is consistent with avoidance of hazard of damage to the battery's cells and/or undesirably rapid rate of gas evolution during charge processes.

The indications of battery state of charge that are claimed comprise indications of departure from the state of charge that apply in normal cycling just prior to initiation of regenerative braking.

Where in the claims reference is made to "battery open circuit voltage" what is intended is the voltage of the battery when it is neither being discharged or charged.

By the term "regenerative braking" is meant battery charging that is responsive to operator implemented initiation of braking which, though, in the preferred embodiment, described as brought into effect as a result of operator pressure on the vehicle's brake pedal, could also be caused to take place as a result of relaxation of operator pressure on the accelerator pedal, as per reference (17), or in some other way.

Where in the claims use is made of the terms "supplementary charging" and "supplementary charge termination", what is intended is that the word supplementary applies to any process of battery charge other than charging that takes place as a consequence of regenerative braking.

Where in the claims reference is made to "as speed allows" what is involved is that where charging would be accomplished with the aid of a motor or some other rotating machine, sufficient voltage would not be developed if the speed of the motor or other rotating power source fell too low, though, in this area, it would apply that with the use of suitable chopper type solid state controls it is possible to provide to charge down to rotating power source speeds that would be lower than if that type of control were not employed.

When it comes to use in the claims of the words "history of cell current flow", in storage batteries oxygen and hydrogen liberated at positive and negative electrodes during charging influences cell voltage and ability to deliver energy on discharge.

For this, and other reasons, it works out that the performance of nickel-cadmium and other secondary batteries, depends not only on the amount of charge received but on how fast it was received, and indeed on the whole history of cell charge and discharge current flow, which accounts for the fact that it can prove useful to take into account the history of cell current flow as a determiner of desirable charge control, rather than to give consideration only to the amount of charge that enters the cell.

Where, in the claims, reference is made to a "parallel hybrid drive", it is to be understood that, in accord with what has come to represent common usage, employment of the term "parallel" implies a drive train in which the vehicle can be driven by the engine alone, or by the motor alone, or by the engine and motor acting together, as see for example FIG. 2 of reference (4).

For the assistance of the reader in understanding the origin of the voltage equations of claims (6) and (7), it is to be noted that the equation of claim (6) follows from combining equation (3) with equation (4) and (5) while the voltage equation of claim (7) follows from combining equations (3) and (4) with equation (16).

Based on the above what I claim is:

1. In a self-propelled parallel hybrid drive type vehicle which includes an electric motor and a fast discharge-recharge type propulsion battery, as well as an engine, and a fast discharge-recharge battery control system, and wherein there is provision to charge the fast discharge-recharge battery with employment of regenerative braking, and to employ supplementary charging with use of energy supplied by the engine, the method of controlling the charging of the fast discharge-recharge type battery which consists in the steps of,
    1. as an override of the operator's control of regenerative braking, providing so that, if not earlier terminated as a result of operator control action, or a drop in vehicle speed, termination of regenerative braking will take place at a point in time determined, at least in part, by the history of cell current subsequent to braking initiation,
    2. providing via response to time-related variations in the magnitude of battery voltage and current, to generate within the said charge control system, one or more indications of the state of charge of the fast discharge-recharge battery following discharge termination,
    3. providing so that supplementary charging, when not held in abeyance by regenerative braking, and except when interrupted by a process of discharge, will terminate when the fast discharge-recharge battery voltage per series connected cell, attains or exceeds a value that depends on information obtained in step 2 above.

2. The method of claim 1 in which the aspect of cell current history responded to in step 1 is its time integral.

3. The method of claim 1 in which termination of regenerative braking will be delayed when the magnitude of charge current during regenerative braking decreases.

4. The method of claim 1 in which, if not earlier terminated, regenerative braking will terminate at a point in time determined in part by an indication of the battery's state of charge just prior to initiation of braking.

5. The method of claim 1 in which it is provided that, following termination of any process of battery discharge, if the battery has remained on open circuit for a predetermined number of seconds, when and as speed allows, and providing, also, that, regenerative braking is not in effect, the battery's charge control system will cause supplementary charging of the fast discharge-recharge battery to come into effect at a controlled rate unless the value of battery voltage on open circuit at the end of said predetermined number of seconds exceeds a charge control system reference value.

6. The method of claim 1 in which termination of supplementary charging, if not otherwise occurring, will be caused to take place when battery voltage per series connected cell first attains the value, $$Vsct = Vcn + ACRsctnIsct + f1[Vdo(t)min - Vdo(t)c]$$

where
 $Vcn$ = a charge control system reference voltage that approximates to battery voltage per series connected cell in normal cycling processes of discharge and recharge, at the start of regenerative braking, when state of charge is normal,
 $Isct$ = battery cell current at termination of supplementary charge,
 $ACRsctn$ = a charge control system reference parameter that approximates apparent cell resistance at supplementary charge termination under normal cycling conditions, is
 $Vdo(t)min$ = the lowest value of $Vdo(t)$ that the battery experiences in the interval between termination of a process of discharge and termination of supplementary charging,
 $Vdo(t)c$ = a control system reference voltage that approximates to $Vdo(t)n$,
 $Vdo(t)$ = the battery voltage per series connected cell that obtains when, following termination of a process of discharge, the battery has remained on open circuit for t seconds,
 $Vdo(t)n$ = the value of $Vdo(t)$ that applies in normal cycling discharge-recharge when state of charge is normal,
and $f1[Vdo(t)min - Vdo(t)c]$ represents an empirically determinable function of $Vdo(t)min$.

7. The method of claim 1 in which, if not otherwise occurring, termination of supplementary charging will be caused to take place when battery voltage per series connected cell attains the value, $$Vsct = Vcn + ACRsctnIsct + F3[SCRjbdt]$$

where
 $ACRjbdt = (Vcn - Vjbdt)/Ijbdt$
 $Vjbdt$ = battery voltage per series connected cell just prior to discharge termination
 $Ijbdt$ = cell current on discharge just prior to discharge termination
 $Vcn$ = a control system reference voltage that approximates to battery voltage per series connected cell at the start of regenerative braking in normal cycling discharge-recharge when state of charge is normal
and $f3[ACRjbdt]$ represents an empirically determinable function of $ACRfbdt$.

8. The method of claim 1 in which the positive electrodes of the fast discharge-recharge type battery are of porous nickel type and have been impregnated with nickelous hydroxide, and in which the cells are equipped with resealable pressure relief type vents which operate to seal against inflow of air, and permit venting of internally generated gas to atmosphere only when cell internal pressure exceeds a predetermined value, and the battery charge control system is so adjusted as to hold rate of gas evolution within the cells low enough to avoid development of sufficient internal pressure to cause venting of internally generated gas.

9. The method of claim 8 in which the negative electrodes are of porous nickel type and have been impregnated with cadmium hydroxide.

10. The method of claim 1 in which the fast discharge-recharge battery is of the lead-acid type.

* * * * *